United States Patent
Oyaizu et al.

(10) Patent No.: US 10,523,873 B2
(45) Date of Patent: Dec. 31, 2019

(54) IMAGE PROCESSING DEVICE AND IMAGE PROCESSING METHOD

(71) Applicant: SONY CORPORATION, Tokyo (JP)

(72) Inventors: Hideki Oyaizu, Tokyo (JP); Yasutaka Hirasawa, Tokyo (JP); Yuhi Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 15/773,440

(22) PCT Filed: Sep. 9, 2016

(86) PCT No.: PCT/JP2016/076606
§ 371 (c)(1),
(2) Date: May 3, 2018

(87) PCT Pub. No.: WO2017/085993
PCT Pub. Date: May 26, 2017

(65) Prior Publication Data
US 2018/0359401 A1 Dec. 13, 2018

(30) Foreign Application Priority Data

Nov. 19, 2015 (JP) ................................. 2015-226741

(51) Int. Cl.
*H04N 5/235* (2006.01)
*H04N 5/225* (2006.01)
(Continued)

(52) U.S. Cl.
CPC ........... *H04N 5/2351* (2013.01); *G02B 5/201* (2013.01); *G02B 5/30* (2013.01); *H04N 5/2258* (2013.01);
(Continued)

(58) Field of Classification Search
CPC ............. H04N 5/2351; H04N 5/35581; H04N 5/35563; H04N 5/35554; H04N 5/2355;
(Continued)

(56) References Cited

U.S. PATENT DOCUMENTS

2005/0007591 A1* 1/2005 Shribak .................... G01J 4/04
356/364
2009/0314928 A1* 12/2009 Parks ................ H01L 27/14629
250/208.1
(Continued)

FOREIGN PATENT DOCUMENTS

CN 2297784 A 11/1998
CN 102057486 A 5/2011
(Continued)

OTHER PUBLICATIONS

International Search Report and Written Opinion of PCT Application No. PCT/JP2016/076606, dated Nov. 8, 2016, 08 pages.

*Primary Examiner* — Lin Ye
*Assistant Examiner* — John H Morehead, III
(74) *Attorney, Agent, or Firm* — Chip Law Group

(57) ABSTRACT

The low-sensitivity polarization characteristic model calculation unit 31 of the polarized image processing unit 30-1 calculates the low-sensitivity polarization characteristic model on the basis of the low-sensitivity polarized image in the plurality of polarization directions that is generated by the low-sensitivity imaging unit 21. The non-saturation polarized image extraction unit 32 extracts an image in a polarization direction in which saturation has not occurred from the high-sensitivity polarized image in the plurality of polarization directions that is generated by the high-sensitivity imaging unit 22. The high-sensitivity component acquisition unit 33-1 calculates a high-sensitivity polarization characteristic model having the phase component identical to the low-sensitivity polarization characteristic model
(Continued)

from an image in a plurality of polarization directions in which saturation has not occurred in the high-sensitivity polarized image. Furthermore, the high-sensitivity component acquisition unit 33-1 acquires the amplitude of the high-sensitivity polarization characteristic model as the polarization component of a photographic object, and acquires the minimum value of the high-sensitivity polarization characteristic model as the non-polarization component of the photographic object. It is possible to determine polarization characteristics of a photographic object with high sensitivity from an image.

19 Claims, 21 Drawing Sheets

(51) Int. Cl.
  *H04N 5/355* (2011.01)
  *G02B 5/30* (2006.01)
  *G02B 5/20* (2006.01)
  *H04N 9/04* (2006.01)
  *H04N 7/18* (2006.01)

(52) U.S. Cl.
  CPC ......... *H04N 5/2353* (2013.01); *H04N 5/2355* (2013.01); *H04N 5/35554* (2013.01); *H04N 5/35563* (2013.01); *H04N 5/35581* (2013.01); *H04N 9/04555* (2018.08); *H04N 7/18* (2013.01)

(58) Field of Classification Search
  CPC ...... H04N 5/2353; H04N 5/2258; H04N 7/18; H04N 9/04555; G02B 5/201; G02B 5/30
  See application file for complete search history.

(56) References Cited

U.S. PATENT DOCUMENTS

| | | | |
|---|---|---|---|
| 2013/0050570 A1* | 2/2013 | Ishigaki | B60R 1/00 348/362 |
| 2013/0188051 A1* | 7/2013 | Ishigaki | G06K 9/00825 348/148 |
| 2014/0071330 A1* | 3/2014 | Zhang | H04N 5/2258 348/345 |
| 2015/0172631 A1* | 6/2015 | Kasahara | H04N 5/3572 348/46 |

FOREIGN PATENT DOCUMENTS

| | | |
|---|---|---|
| EP | 2297784 A | 3/2011 |
| EP | 2618304 A1 | 7/2013 |
| JP | 2011-135360 A | 7/2011 |
| JP | 2011-526105 A | 9/2011 |
| JP | 4974543 B2 | 7/2012 |
| JP | 2013-167624 A | 8/2013 |
| KR | 10-2011-0025909 A | 3/2011 |
| TW | 201015712 A | 4/2010 |
| WO | 2009/154713 A1 | 12/2009 |

\* cited by examiner

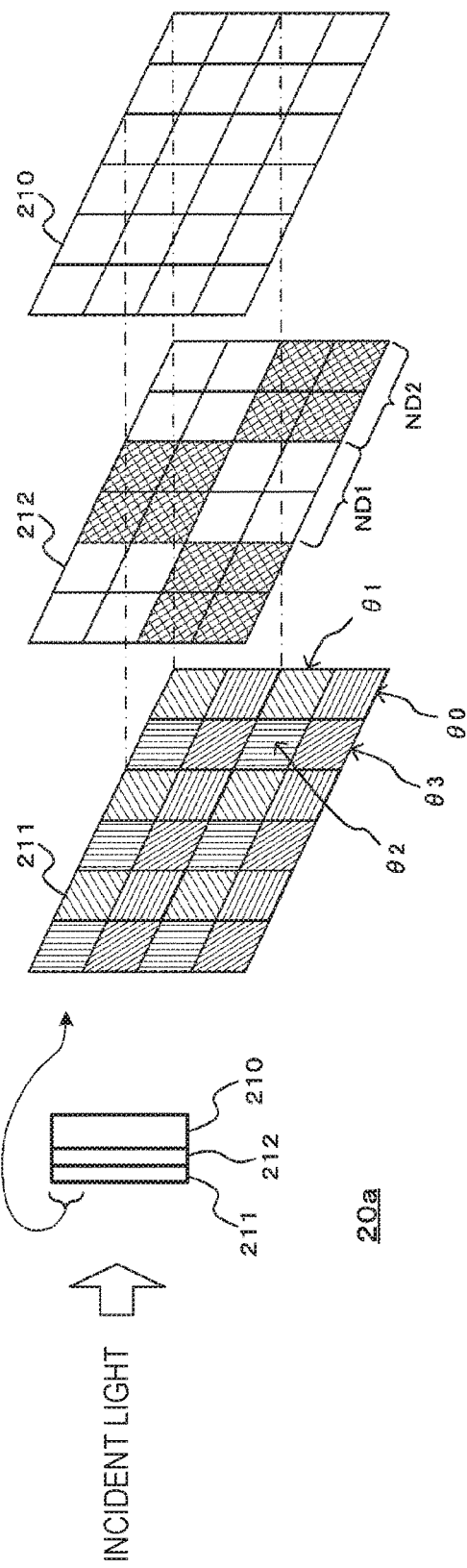

IMAGE PROCESSING DEVICE AND IMAGE PROCESSING METHOD

CROSS REFERENCE TO RELATED APPLICATIONS

This application is a U.S. National Phase of International Patent Application No. PCT/JP2016/076606 filed on Sep. 9, 2016 which claims priority benefit of Japanese Patent Application No. JP 2015-226741 filed in the Japan Patent Office on Nov. 19, 2015. Each of the above-referenced applications is hereby incorporated herein by reference in its entirety.

TECHNICAL FIELD

This technology relates to an image processing device and an image processing method, and is intended to determine polarization characteristics of a photographic object with high sensitivity from an image.

BACKGROUND ART

In related art, polarization is used to separate a reflection component or the like. In one example, in Patent Literature 1, the intensity of transmitted light passing through a polarizer unit in which a polarizer region is divided into a plurality of polarization directions is fitted to a cosine curve that is a polarization characteristic model, so separation into a non-polarization component and a polarization component that is a reflection component is performed.

CITATION LIST

Patent Literature

Patent Literature 1: JP 4974543B

DISCLOSURE OF INVENTION

Technical Problem

Meanwhile, in the case of fitting the intensity of the transmitted light to the cosine curve, if strong reflected light (e.g., reflected sunlight) from a photographic object passes through the above-described polarizer unit and is incident on the image sensor, an image signal output from the image sensor will be a saturated signal because the incident light is strong. For this reason, it is difficult to fit luminance for each polarization component to the polarization characteristic model. In addition, if the quantity of incident light is set to be limited or the exposure time is set to be reduced in such a way that the signal output from the image sensor is not saturated, the luminance for each polarization component decreases, and accordingly, the polarization characteristic model is a low-sensitivity polarization characteristic model, resulting in reduction, in one example, in the level of the non-polarization component. Thus, the image of non-polarization components of a photographic object will be an image with deteriorated image quality due to influences including noise in the image sensor, rounding error in signal processing, or the like.

In view of this, this technology provides an image processing device and an image processing method, capable of determining polarization characteristics of a photographic object with high sensitivity from an image.

Solution to Problem

A first aspect of this technology is an image processing device including: a polarized image processing unit configured to determine polarization characteristics of a high-sensitivity image on a basis of a low-sensitivity polarized image in a plurality of polarization directions and the high-sensitivity image having higher sensitivity than the low-sensitivity polarized image to acquire a non-polarization component or a polarization component of a photographic object on a basis of the polarization characteristics of the high-sensitivity image.

In this technology, the polarized image processing unit determines the polarization characteristics of the high-sensitivity image on the basis of the low-sensitivity polarized image in the plurality of polarization directions and the high-sensitivity image having higher sensitivity than the low-sensitivity polarized image. In one example, the polarized image processing unit calculates the low-sensitivity polarization characteristic model on the basis of the low-sensitivity polarized image and calculates the high-sensitivity polarization characteristic model on the basis of the low-sensitivity characteristic model and the image of the polarization direction in which saturation has not occurred in the high-sensitivity polarized image or on the basis of the ratio between the average value of the low-sensitivity polarization characteristic model and the luminance of the high-sensitivity polarized image and the low-sensitivity polarization characteristic model.

In the case where the high-sensitivity polarization characteristic model is calculated on the basis of the low-sensitivity characteristic model and the image of the polarization direction in which saturation has not occurred in the high-sensitivity polarized image, the polarized image processing unit calculates the high-sensitivity polarization characteristic model having the phase component identical to the low-sensitivity polarization characteristic model indicating the relationship between the polarization direction and the luminance of the polarization component from the luminance in the plurality of polarization directions in which saturation has not occurred in the high-sensitivity polarized image on the basis of the phase information of the low-sensitivity polarization characteristic model and the image in the plurality of polarization directions in which saturation has not occurred in the high-sensitivity polarized image. Alternatively, the polarized image processing unit calculates the high-sensitivity polarization characteristic model having the phase component identical to the low-sensitivity polarization characteristic model indicating the relationship between the polarization direction and the luminance of the polarization component in such a way that the ratio between the amplitude and the sum of offsets in the low-sensitivity polarization characteristic model and the high-sensitivity polarization characteristic model is equal to the ratio between associated luminance values of the high-sensitivity polarized image and the low-sensitivity polarized image on the basis of the relationship between the luminance of the polarization direction in which saturation has not occurred in the high-sensitivity polarized image and the luminance in the low-sensitivity polarized image of the identical polarization direction. In addition, in the case where all the high-sensitivity polarized images in the plurality of polarization directions are in the saturation state, the polarized image processing unit calculates the high-sensitivity polarization characteristic model on the basis of the high-sensitivity polarized image.

In the case where the non-polarized image is used as the high-sensitivity image, the polarized image processing unit calculates the high-sensitivity polarization characteristic model from the low-sensitivity polarization characteristic model on the basis of the ratio between the average value of the low-sensitivity polarization characteristic model and the luminance of the high-sensitivity image.

The polarized image processing unit acquires, in one example, an amplitude of the high-sensitivity polarization characteristic model as the polarization component of the photographic object and acquires the minimum value of the high-sensitivity polarization characteristic model as the non-polarization component of the photographic object on the basis of the high-sensitivity polarization characteristic model. The polarized image processing unit, in the case where all the high-sensitivity polarized images in the plurality of polarization directions are in the saturation state, acquires the non-polarization component or the polarization component of the photographic object on the basis of the low-sensitivity polarization characteristic model.

Further, the image processing device is provided with an imaging control unit to cause the low-sensitivity polarized image and the high-sensitivity image to be generated by changing an exposure time of an imaging unit. In one example, the imaging control unit controls the exposure time in such a way that a polarization direction in the low-sensitivity polarized image is in a non-saturation state in three or more directions and a polarization direction in the high sensitivity image is in a non-saturation state in one or more directions.

Further, the image processing device is provided with an imaging unit configured to generate the low-sensitivity polarized image and the high-sensitivity image. The imaging unit sets the polarization direction in units of pixels and generates the low-sensitivity polarized image including pixels in the plurality of polarization directions. In addition, the imaging unit has a configuration for generating the low-sensitivity polarized image and the high-sensitivity image by changing the exposure time, a configuration including a low-sensitivity imaging unit configured to generate the low-sensitivity polarized image and a high-sensitivity imaging unit configured to generate the high-sensitivity image by limiting quantity of incident light more than the quantity of incident light limited by the low-sensitivity imaging unit, or a configuration including a low-sensitivity pixel configured to generate the low-sensitivity polarized image and a high-sensitivity pixel configured to generate the high-sensitivity image by limiting quantity of incident light more than the quantity of incident light limited by the low-sensitivity pixel.

A second aspect of this technology is an image processing method including: determining polarization characteristics of a high-sensitivity image on a basis of a low-sensitivity polarized image in a plurality of polarization directions and the high-sensitivity image having higher sensitivity than the low-sensitivity polarized image; and acquiring a non-polarization component or a polarization component of a photographic object on a basis of the polarization characteristics of the high-sensitivity image.

Advantageous Effects of Invention

According to this technology, polarization characteristics of the high-sensitivity image is determined on the basis of the low-sensitivity polarized image in the plurality of polarization directions and the high-sensitivity image having higher sensitivity than the low-sensitivity polarized image, and the non-polarization component or the polarization component of the photographic object is acquired on the basis of the polarization characteristics of the high-sensitivity image. Thus, it is possible to determine polarization characteristics of the photographic object with high sensitivity from the image, thereby acquiring the high-sensitivity non-polarization component or polarization component. Moreover, the effects described herein are merely illustrative but not restrictive, or there may be additional advantageous effects.

BRIEF DESCRIPTION OF DRAWINGS

FIG. 18 is a diagram illustrating a configuration of an imaging unit that simultaneously generates a low-sensitivity polarized image and a high-sensitivity polarized image.

FIGS. 19(a), (b), (c), (d), (e), (f), (g), and (h) are diagrams illustrating a color mosaic filter and a polarization pattern.

MODE(S) FOR CARRYING OUT THE INVENTION

Modes for carrying out the present technology will be described below. Moreover, the description will be given in the following order.
1. First Embodiment
2. Second Embodiment
3. Third Embodiment 4. Other Embodiments
5. Application Example

1. First Embodiment

Figure 1:
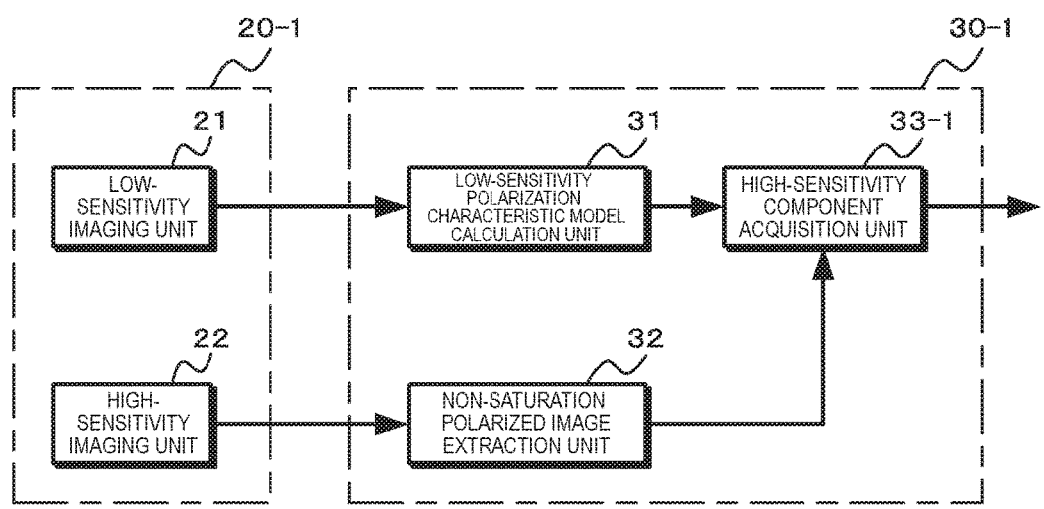
FIG. 1 is a diagram illustrating a configuration of a first embodiment.

FIG. 1 illustrates the configuration of a first embodiment of the present technology. An image processing device 10-1 includes an imaging unit 20-1 and a polarized image processing unit 30-1.

The imaging unit 20-1 includes a low-sensitivity imaging unit 21 and a high-sensitivity imaging unit 22, which has higher sensitivity than the low-sensitivity imaging unit 21.

Figure 2:
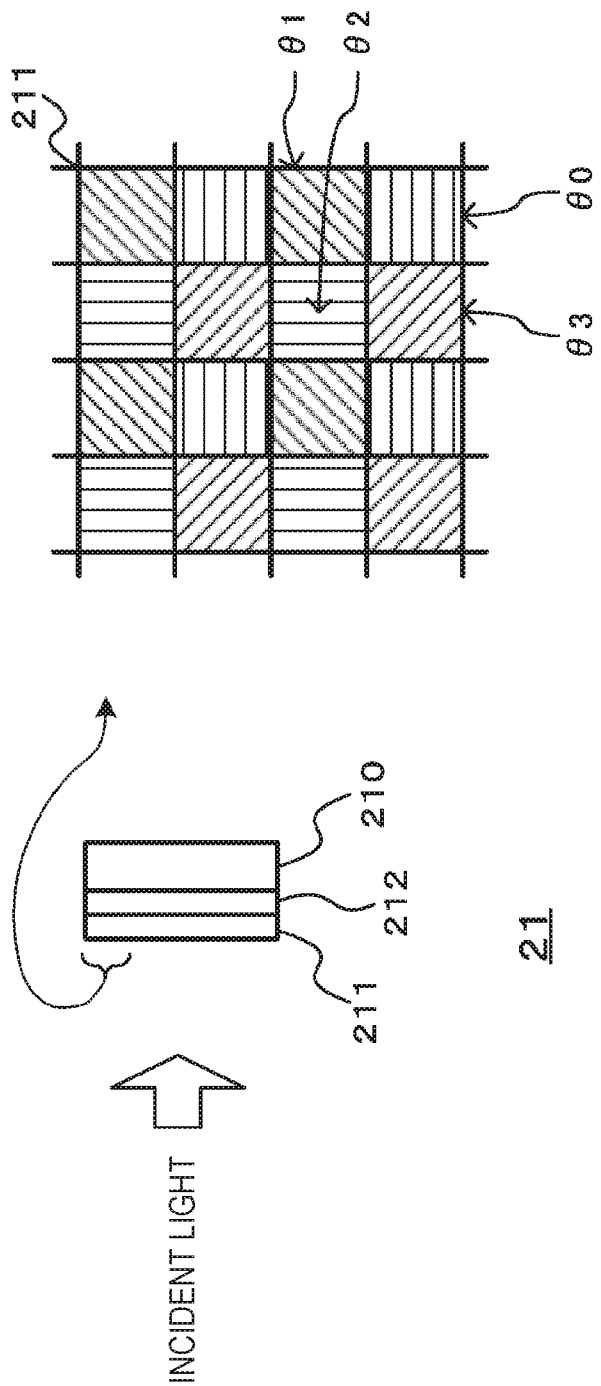
FIG. 2 is a diagram illustrating a configuration of an imaging unit.

The low-sensitivity imaging unit 21 and the high-sensitivity imaging unit 22 each generates an image signal of a polarized image including pixels for each of a plurality of polarization components. FIG. 2 illustrates the configuration of the imaging unit. In the imaging unit 20-1, the low-sensitivity imaging unit 21 is configured such that a polarization filter 211 having the pixel arrangement with polarization directions of three or more directions is arranged on the incident surface of an image sensor 210. Moreover, in FIG. 2, the polarization filter 211 has a configuration in which a plurality of polarizer units of, in one example, 2×2 pixels are provided adjacent to each other. Alternatively, the polarizer unit has, in one example, four polarization directions of θ0 (e.g., polarization angle of 0°), θ1 (e.g., 45°), θ2 (e.g., 90°), and θ3 (e.g., 135°) in units of pixels.

The low-sensitivity imaging unit 21 is configured in such a way that the image signal output from the image sensor 210 is not saturated even if the incident light has high luminance. In one example, a light quantity limiting unit 212 (e.g., an ND filter) for limiting the quantity of incident light is provided on the incident surface side of the image sensor 210 or the polarization filter 211 in such a way that the image signal is not saturated at each pixel. The low-sensitivity imaging unit 21 outputs the image signal of the generated polarized image to the polarized image processing unit 30-1.

The high-sensitivity imaging unit 22 has a configuration in which the polarization filter 211 having the pixel arrangement with polarization directions of three or more directions is arranged on the incident surface of the image sensor 210, which is similar to the low-sensitivity imaging unit 21. The high-sensitivity imaging unit 22 has, in one example, a configuration that does not include a light quantity limiting unit and has higher sensitivity than the low-sensitivity imaging unit 21. The high-sensitivity imaging unit 22 outputs the image signal of the generated polarized image to the polarized image processing unit 30-1.

The polarized image processing unit 30-1 determines polarization characteristics of a high-sensitivity image on the basis of a low-sensitivity polarized image with a plurality of polarization directions that is obtained by capturing a photographic object by the low-sensitivity imaging unit 21 and a high-sensitivity image having higher sensitivity than the low-sensitivity polarized image that is obtained by the high-sensitivity imaging unit 22, that is, a high-sensitivity polarized image with the plurality of polarization directions equal to the low-sensitivity polarized image. In addition, the polarized image processing unit 30-1 acquires a non-polarization component or a polarization component of a photographic object on the basis of the determined polarization characteristics of the high-sensitivity image.

The polarized image processing unit 30-1 includes a low-sensitivity polarization characteristic model calculation unit 31, a non-saturation polarized image extraction unit 32, and a high-sensitivity component acquisition unit 33-1. The polarized image processing unit 30-1 calculates a polarization characteristic model of the low-sensitivity polarized image (hereinafter referred to as "low-sensitivity polarization characteristic model") on the basis of the low-sensitivity polarized image, calculates a polarization characteristic model of the high-sensitivity image (hereinafter referred to as "high-sensitivity polarization characteristic model") on the basis of the low-sensitivity polarization characteristic model and the high-sensitivity image, and acquires a non-polarization component or a polarization component of a photographic object on the basis of the high-sensitivity polarization characteristic model.

The low-sensitivity polarization characteristic model calculation unit 31 calculates a low-sensitivity polarization characteristic model from a luminance value $Fm(i,j)$ at a target pixel $(i,j)$ of the low-sensitivity polarized image with four polarization directions that is generated by the low-sensitivity imaging unit 21. Moreover, "M" is an index indicating the polarization direction, and the polarization directions θ0 to θ3 are set to m=0 to 3. In addition, the target pixel $(i,j)$ of the low-sensitivity polarized image and the target pixel $(i,j)$ of the high-sensitivity image are pixels indicating the same position of a photographic object.

It is known that the polarization characteristic model can be represented by Formula (1). Thus, the low-sensitivity polarization characteristic model calculation unit 31 calculates coefficients $Af(i,j)$, $Bf(i,j)$, and $\theta f(i,j)$ on the basis of the luminance value $Fm(i,j)$ for each polarization component of the target pixel $(i,j)$.

$$Fm(i,j)=Af(i,j)[1+\cos(2\theta m+2\theta f(i,j))]+Bf(i,j) \qquad (1)$$

The non-saturation polarized image extraction unit 32 extracts luminance of the polarization direction that is in a non-saturation state, on the basis of Formula (2), from luminance value $Gm(i,j)$ of the target pixel $(i,j)$ of the high-sensitivity polarized image with polarization direction, for example, four directions that is generated by the high-sensitivity imaging unit 22, and generates a high-sensitivity non-saturation set. Moreover, in Formula (2), the threshold Th is a value for determining whether the luminance is saturated, and, in one example, it is preset to the saturation level in the high-sensitivity imaging unit 22, and if the luminance is equal to the threshold Th, then it is determined that the luminance is saturated.

$$G(i,j)=[Gn(i,j):n\leq 3, Gn(i,j)<Th] \qquad (2)$$

The high-sensitivity component acquisition unit 33-1 calculates a high-sensitivity polarization characteristic model, from phase information of the low-sensitivity polarization characteristic model and the luminance in a plurality of polarization directions in which saturation has not occurred in the high-sensitivity polarized image. The target pixel $(i,j)$ of the low-sensitivity polarized image and the target pixel $(i,j)$ of the high-sensitivity image are pixels indicating the same position of the photographic object, so the phases of the low-sensitivity polarization characteristic model and the high-sensitivity polarization characteristic model are identical to each other. Thus, the high-sensitivity component acquisition unit 33-1 calculates a high sensitivity polarization characteristic model having the same phase component as the low-sensitivity polarization characteristic model that indicates the relationship between the polarization direction and luminance of the polarization component by using the luminance in a plurality of polarization directions in which saturation has not occurred in the high-sensitivity polarized image. Specifically, the high-sensitivity component acquisition unit 33-1 calculates coefficients $Ag(i,j)$ and $Bg(i,j)$ of Formula (3) indicating the high-sensitivity polarization characteristic model by using a plurality of elements of a high-sensitivity non-saturation set SG(i,j).

$$Gm(i,j)=Ag(i,j)[1+\cos(2\theta m+2\theta f(i,j))]+Bg(i,j) \quad (3)$$

In Formula (3), "θf(i,j)" is calculated by the low-sensitivity polarization characteristic model calculation unit 31. Thus, a plurality of elements are only necessary to be included in the high-sensitivity non-saturation set SG(i,j) to calculate the coefficients Ag(i,j) and Bg(i,j). The high-sensitivity component acquisition unit 33-1 acquires the polarization component on the basis of the high-sensitivity polarization characteristic model using the calculated coefficients Ag(i,j) and Bg(i,j).

Figure 3:
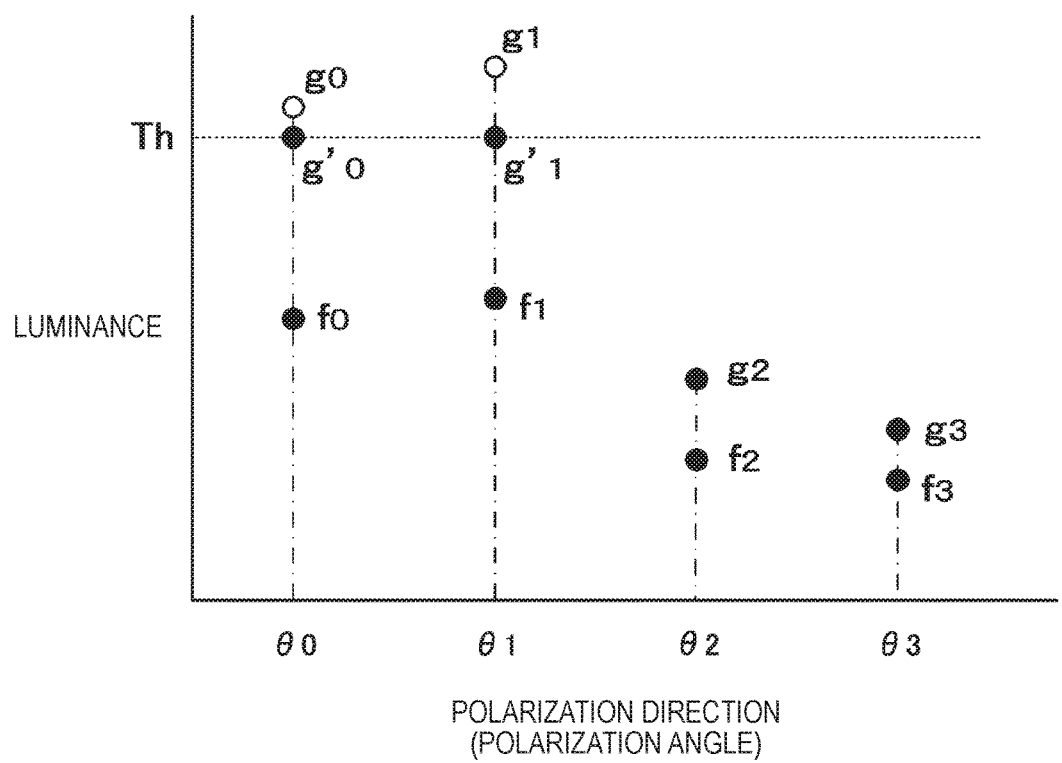
FIG. 3 is a diagram illustrating luminance for each polarization direction in a target pixel.

In one example, in the case the luminance is in the non-saturation state in the polarization directions θ2 (m=2) and θ3 (m=3) at the target pixel (i,j) (G2(i,j)=g2 and G3(i,j)=g3) as illustrated in FIG. 3 to be described later, the coefficients Ag(i,j) and Bg(i,j) can be calculated by solving the quadratic simultaneous equation of Formula (4).

$$G2(i,j)=Ag(i,j)[1+\cos(2\theta 2+2\theta f(i,j))]+Bg(i,j)$$

$$G3(i,j)=Ag(i,j)[1+\cos(2\theta 3+2\theta f(i,j))]+Bg(i,j) \quad (4)$$

The high-sensitivity component acquisition unit 33-1 calculates the high-sensitivity polarization characteristic model by substituting the calculated coefficients Ag(i,j) and Bg(i,j) into Formula (3). In addition, the high-sensitivity component acquisition unit 33-1 calculates, in one example, the amplitude from the high-sensitivity polarization characteristic model and sets it as a polarization component in the high-sensitivity polarized image. In addition, the high-sensitivity component acquisition unit 33-1 calculates, in one example, the minimum value from the high-sensitivity polarization characteristic model and sets it as a non-polarization component in the high-sensitivity polarized image. Moreover, the high-sensitivity component acquisition unit 33-1 may calculate the average value of the high-sensitivity polarization characteristic model to generate a high-sensitivity non-polarized image.

Next, the operation of the first embodiment will be described. FIG. 3 illustrates the luminance for each polarization direction in a target pixel. In one example, the quantity of incident light is limited in the low-sensitivity imaging unit 21, so the luminance is not saturated even if the incident light is strong. However, the quantity of incident light is not limited in the high-sensitivity imaging unit 22, so if the incident light is strong, the luminance of a target pixel will be saturated. In one example, FIG. 3 illustrates a case where the luminance is saturated in the polarization direction θ0 and the polarization direction θ1. In FIG. 3, a luminance value g0 in the polarization direction θ0 at the target pixel is saturated to be a luminance value g'0 and a luminance value g1 in the polarization direction θ1 is saturated to be a luminance value g'1. Moreover, in a case where the saturation level is set as the threshold Th, the luminance values g'0 and g'1 are equal to the threshold Th.

Figure 4:
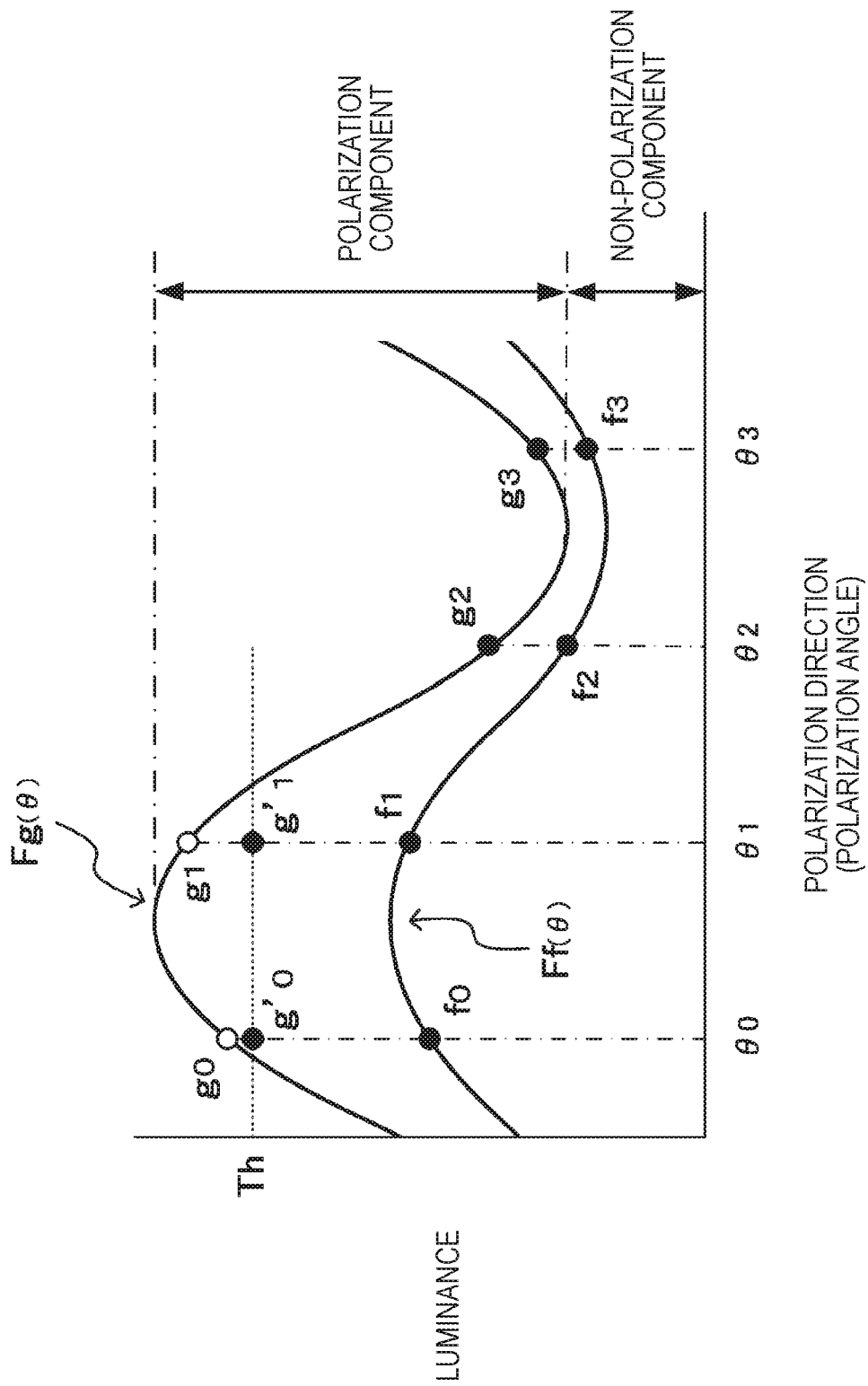
FIG. 4 is a diagram illustrating a polarization characteristic model.

The low-sensitivity polarization characteristic model calculation unit 31 of the polarized image processing unit 30-1 calculates the coefficients Af, Bf, and θf on the basis of luminance values f0, f1, f2, and f3 for the respective polarization directions at the target pixel of the low-sensitivity polarized image. In other words, the low-sensitivity polarization characteristic model calculation unit 31 calculates a low-sensitivity polarization characteristic model Ff(θ) illustrated in FIG. 4.

The non-saturation polarized image extraction unit 32 compares the luminance for each polarization direction at the target pixel of the high-sensitivity polarized image with the threshold Th to generate a high-sensitivity non-saturation set including luminance in the unsaturated polarization direction. In one example, in a case where the luminance values for the respective polarization directions at the target pixel of the high-sensitivity polarized image are g0, g1, g2, and g3, and the luminance values g2 and g3 are smaller than the threshold Th, the high-sensitivity non-saturation set includes the luminance value g2 in the polarization direction θ2 and the luminance value g3 in the polarization direction θ3.

The high-sensitivity component acquisition unit 33-1 calculates the coefficients Af and Bf on the basis of the luminance values g2 and g3 in the high-sensitivity non-saturation set at the target pixel of the high-sensitivity polarized image. In other words, the phases of the low-sensitivity polarization characteristic model and the high-sensitivity polarization characteristic model are identical to each other, so the high-sensitivity component acquisition unit 33-1 calculates the coefficients Af and Bf, and substitutes the coefficients Af and Bf into Formula (3), thereby calculating a high-sensitivity polarization characteristic model Fg(θ) illustrated in FIG. 4. Furthermore, the high-sensitivity component acquisition unit 33-1 outputs the amplitude of the high-sensitivity polarization characteristic model Fg(θ) as the polarization component. In addition, the high-sensitivity component acquisition unit 33-1 outputs the minimum value of the high-sensitivity polarization characteristic model Fg(θ) as the non-polarization component.

The polarized image processing unit 30-1 sequentially shifts the position of the target pixel and causes the low-sensitivity polarization characteristic model calculation unit 31, the non-saturation polarized image extraction unit 32, and the high-sensitivity component acquisition unit 33-1 to repeatedly perform the above-described processing, thereby outputting an image of a non-polarization component or a polarization component of a photographic object based on the polarization characteristics of the high-sensitivity image.

Figure 5:
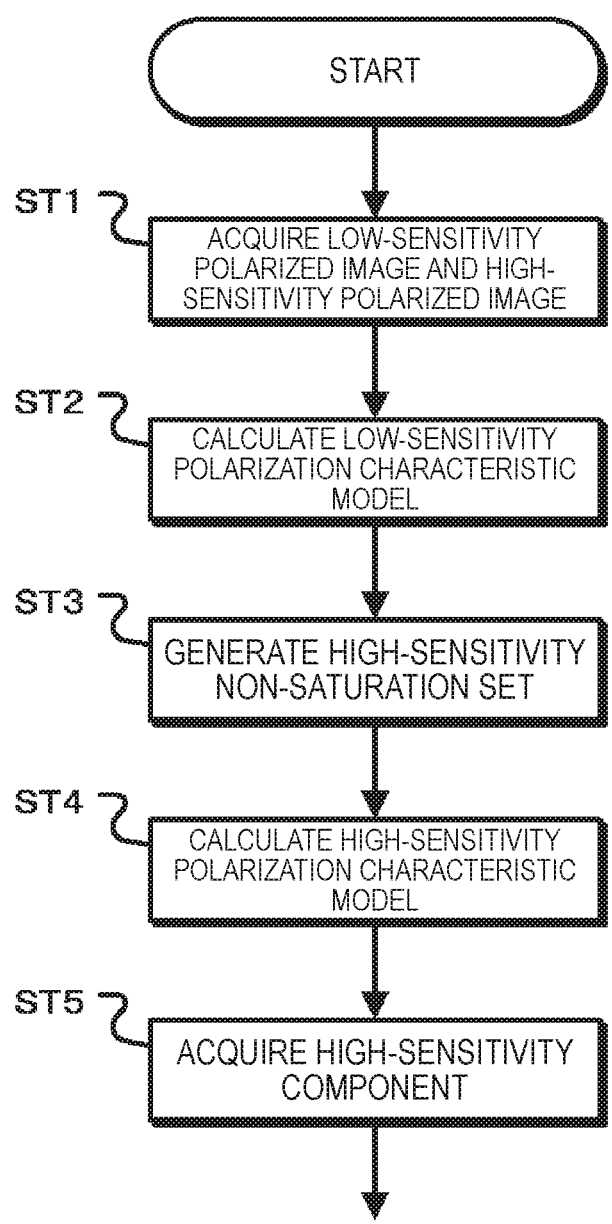
FIG. 5 is a flowchart illustrating an operation of the first embodiment.

FIG. 5 is a flowchart illustrating the operation of the first embodiment. In step ST1, the image processing device 10-1 acquires a low-sensitivity polarized image and a high-sensitivity polarized image. The image processing device 10-1 acquires the low-sensitivity polarized image including pixels in a plurality of polarization directions, for example, pixels with polarization directions of three or more directions and acquires the high-sensitivity polarized image having higher sensitivity than the low-sensitivity polarized image, then proceeds to step ST2.

In step ST2, the image processing device 10-1 calculates a low-sensitivity polarization characteristic model. The image processing device 10-1 performs fitting to the polarization characteristic model using the luminance of the low-sensitivity polarized image in the plurality of polarization directions, and calculates the low-sensitivity polarization characteristic model, then proceeds to step ST3.

In step ST3, the image processing device 10-1 generates a high-sensitivity non-saturation set. The image processing device 10-1 extracts the luminance in the polarization direction of the non-saturation state from the high-sensitivity polarized image, and generates a high-sensitivity non-saturation set, then proceeds to step ST4.

In step ST4, the image processing device 10-1 calculates a high-sensitivity polarization characteristic model by using the high-sensitivity non-saturation set. The image processing device 10-1 calculates the coefficients Af and Bf as described above by using the luminance in the plurality of polarization directions included in the high-sensitivity non-saturation set. The image processing device 10-1 calculates the high-sensitivity polarization characteristic model by using the calculated coefficients Ag and Bg instead of the coefficients Af and Bf in the low-sensitivity polarization characteristic model calculated in step ST2, then proceeds to step ST5.

In step ST5, the image processing device 10-1 acquires a high-sensitivity component. The image processing device 10-1 acquires the amplitude value of the high-sensitivity polarization characteristic model as a polarization component and acquires the minimum value of the high-sensitivity polarization characteristic model as a non-polarization component. In addition, the image processing device 10-1 outputs the polarization component and/or the non-polarization component acquired on the basis of the high-sensitivity polarization characteristic model.

The image processing device 10-1 sequentially shifts the position of the target pixel, performs the above-described processing for each target pixel, and outputs an image of a non-polarization component or a polarization component of a photographic object based on polarization characteristics of the high-sensitivity image.

Figure 6:
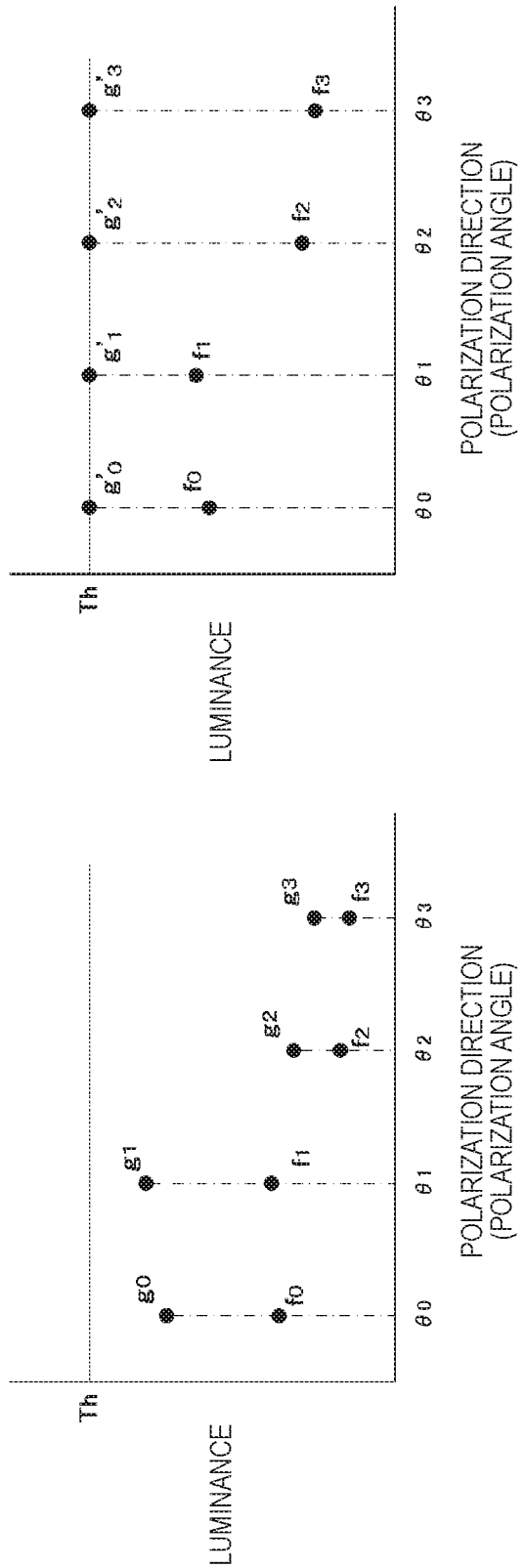
FIGS. 6(a) and 6(b) are diagrams illustrating a case where all luminance values in the respective polarization directions are in a saturation state or a non-saturation state.

Further, in the case where all luminance values in the respective polarization directions in the high-sensitivity polarized image are in the saturation state or the non-saturation state, the high-sensitivity component acquisition unit 33-1 extracts a polarization component or a non-polarization component from a polarization characteristic model corresponding to each state. FIGS. 6(*a*) and 6(*b*) illustrate a case where all luminance values in the respective polarization directions are in the saturation state or the non-saturation state. As illustrated in FIG. 6(*a*), in the case where none of luminance values in the respective polarization directions are saturated in the high-sensitivity polarized image, coefficients Ag(i,j), Bg(i,j), and θf(i,j) are calculated from the luminance in each polarization direction included in the high-sensitivity non-saturation set to calculate the high-sensitivity polarization characteristic model. Furthermore, as illustrated in FIG. 6(*b*), in the case where all luminance values in the respective polarization directions are saturated in the high-sensitivity polarized image, the high-sensitivity component acquisition unit 33-1 acquires a polarization component or a non-polarization component from the low-sensitivity polarization characteristic model.

Figure 7:
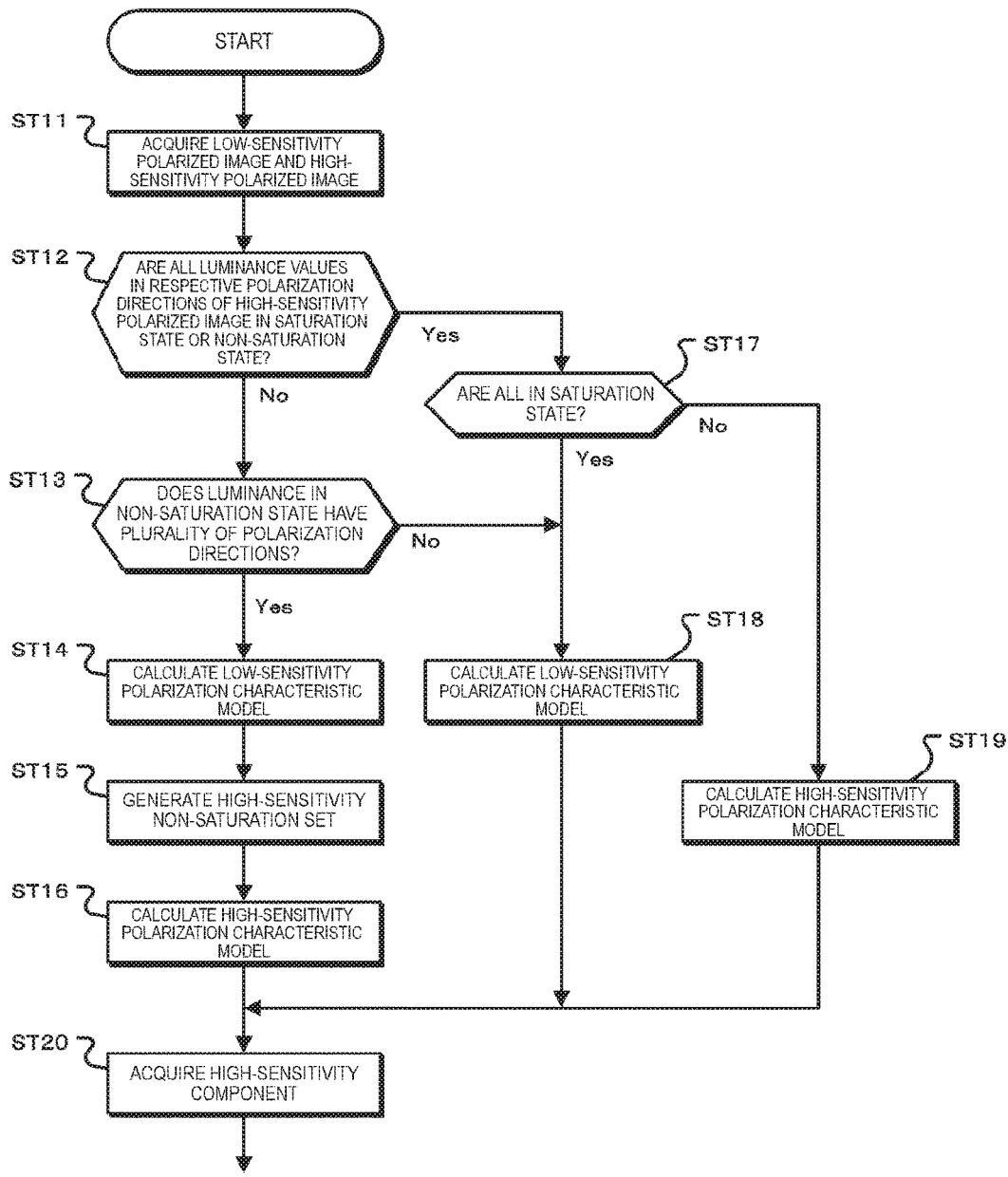
FIG. 7 is a flowchart illustrating another operation of the first embodiment.

FIG. 7 is a flowchart illustrating other operation of the first embodiment. In step ST11, the image processing device 10-1 acquires a low-sensitivity polarized image and a high-sensitivity polarized image. The image processing device 10-1 acquires the low-sensitivity polarized image including pixels in a plurality of different polarization directions, for example, pixels with polarization directions of three or more directions and acquires the high-sensitivity polarized image having higher sensitivity than the low-sensitivity polarized image, then proceeds to step ST12.

In step ST12, the image processing device 10-1 discriminates whether all luminance values in the respective polarization directions of the high-sensitivity polarized image are in the saturation state or non-saturation state. The image processing device 10-1 proceeds to step ST17 in the case where all luminance values are in the saturation state or the non-saturation state, but proceeds to step ST13 in the case where the luminance of the saturation state and the non-saturation state is included.

In step ST13, the image processing device 10-1 discriminates whether the luminance in the non-saturation state has a plurality of polarization directions. In the case where the luminance in the non-saturation state is the plurality of polarization directions, the image processing device 10-1 proceeds to step ST14, but in the case where the luminance in the non-saturation state is only one polarization direction, the image processing device 10-1 proceeds to step ST18.

In step ST14, the image processing device 10-1 calculates a low-sensitivity polarization characteristic model. The image processing device 10-1 performs fitting to the polarization characteristic model using the luminance of the low-sensitivity polarized image in the plurality of polarization directions, and calculates the low-sensitivity polarization characteristic model, then proceeds to step ST15.

In step ST15, the image processing device 10-1 generates a high-sensitivity non-saturation set. The image processing device 10-1 extracts the luminance in the non-saturation state from the high-sensitivity polarized image, and generates a high-sensitivity non-saturation set, then proceeds to step ST16.

In step ST16, the image processing device 10-1 calculates a high-sensitivity polarization characteristic model by using the high-sensitivity non-saturation set. The image processing device 10-1 calculates the coefficients Af and Bf as described above by using the luminance in the plurality of polarization directions included in the high-sensitivity non-saturation set. The image processing device 10-1 calculates the high-sensitivity polarization characteristic model by using the calculated coefficients Ag and Bg instead of the coefficients Af and Bf in the low-sensitivity polarization characteristic model calculated in step ST14, then proceeds to step ST20.

If the processing proceeds from step ST12 to step ST17, the image processing device 10-1 discriminates whether all of them are in the saturation state. In the case where it is discriminated that all luminance values in the respective polarization directions are in the saturation state, the image processing device 10-1 proceeds to step ST18. In the case where it is discriminated that all luminance values in the respective polarization directions are in the non-saturation state, the image processing device 10-1 proceeds to step ST19.

If the processing proceeds from step ST13 or ST17 to step ST18, the image processing device 10-1 calculates a low-sensitivity polarization characteristic model. The image processing device 10-1 performs fitting to the polarization characteristic model by using the low-sensitivity polarized image in the plurality of polarization directions and calculates the low-sensitivity polarization characteristic model, then proceeds to step ST20.

If the processing proceeds from step ST17 to step ST19, the image processing device 10-1 calculates a high-sensitivity polarization characteristic model. The image processing device 10-1 performs fitting to the polarization characteristic model by using the high-sensitivity polarized image in the plurality of polarization directions and calculates the high-sensitivity polarization characteristic model, then proceeds to step ST20.

In step ST20, the image processing device 10-1 acquires a high-sensitivity component. The image processing device 10-1 acquires the amplitude of the polarization characteristic model created in step ST16, ST18, or ST19 as the polarization component and acquires the minimum value of the polarization characteristic model as the non-polarization component. In addition, the image processing device 10-1 outputs the polarization component and/or the non-polarization component acquired on the basis of the polarization characteristic model.

The processing illustrated in FIG. 7 makes it possible for the image processing device 10-1 to output the polarization component and/or the non-polarization component as a component relating to the polarization even if all luminance values in the respective polarization directions are in the saturation state or non-saturation state.

According to the first embodiment as described above, even if the polarized image in some of the polarization directions is saturated in the high-sensitivity polarized image, it is possible to calculate the high-sensitivity polarization characteristic model on the basis of the low-sensitivity polarization characteristic model and the high-sensitivity polarized image. Thus, it is possible to determine the polarization characteristics of the photographic object with high sensitivity. In addition, the polarization component or the non-polarization component can be obtained with high sensitivity on the basis of the high-sensitivity polarization characteristic model, so, in one example, an non-polarized image with satisfactory image quality can be obtained.

2. Second Embodiment

Figure 8:
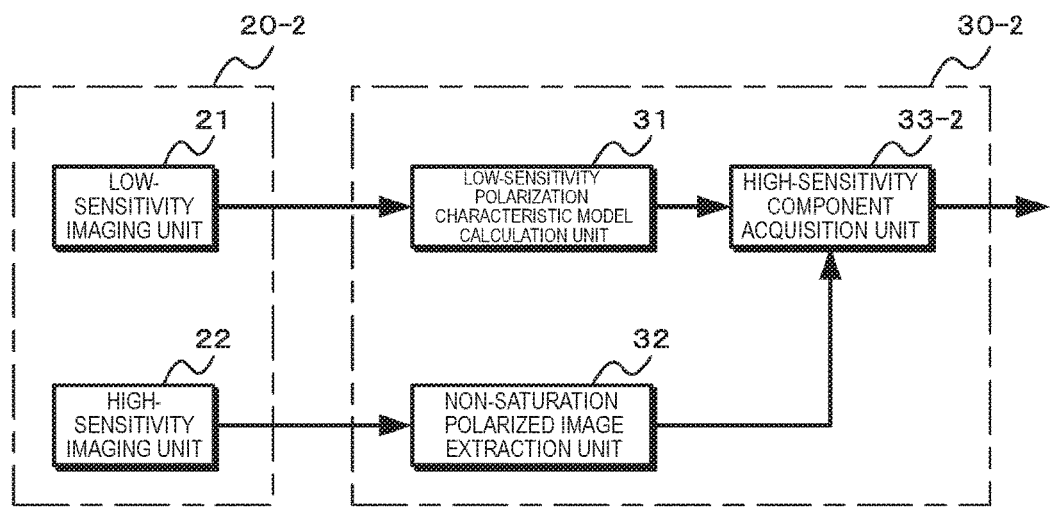
FIG. 8 is a diagram illustrating a configuration of a second embodiment.

Next, a second embodiment will be described. FIG. 8 illustrates the configuration of a second embodiment of the present technology. An image processing device 10-2 includes an imaging unit 20-2 and a polarized image processing unit 30-2.

The imaging unit 20-2 includes a low-sensitivity imaging unit 21 and a high-sensitivity imaging unit 22 having higher sensitivity than the low-sensitivity imaging unit 21, which is similar to the first embodiment. The low-sensitivity imaging unit 21 and the high-sensitivity imaging unit 22 have the configuration similar to that of the first embodiment.

The low-sensitivity imaging unit 21 is configured in such a way that the image signal output from the image sensor is not saturated even if the incident light has high luminance. In one example, a light quantity limiting unit for limiting the quantity of incident light is provided on the incident surface side of the image sensor or the polarization filter in such a way that the image signal is not saturated. The low-sensitivity imaging unit 21 outputs the image signal of the generated polarized image to the polarized image processing unit 30-2.

The high-sensitivity imaging unit 22 has a configuration in which the polarization filter having the pixel arrangement with polarization directions of three or more directions is arranged on the incident surface of the image sensor, which is similar to the low-sensitivity imaging unit 21. The high-sensitivity imaging unit 22 has, in one example, a configuration that does not include a light quantity limiting unit and has higher sensitivity than the low-sensitivity imaging unit 21. The high-sensitivity imaging unit 22 outputs the image signal of the generated polarized image to the polarized image processing unit 30-2.

The polarized image processing unit 30-2 determines polarization characteristics of a high-sensitivity image on the basis of a low-sensitivity polarized image with a plurality of polarization directions that is obtained by capturing a photographic object by the low-sensitivity imaging unit 21 and a high-sensitivity image having higher sensitivity than the low-sensitivity polarized image that is obtained by the high-sensitivity imaging unit 22, for example, a high-sensitivity polarized image with the plurality of polarization directions. In addition, the polarized image processing unit 30-2 acquires a non-polarization component or a polarization component of a photographic object on the basis of the determined polarization characteristics of the high-sensitivity image.

The polarized image processing unit 30-2 includes a low-sensitivity polarization characteristic model calculation unit 31, a non-saturation polarized image extraction unit 32, and a high-sensitivity component acquisition unit 33-2. The polarized image processing unit 30-2 calculates a high-sensitivity polarization characteristic model having the same phase component as the low-sensitivity polarization characteristic model indicating the relationship between the polarization direction and the luminance of the polarization component in such a way that a ratio between the amplitude and the sum of offsets in the low-sensitivity polarization characteristic model and the high-sensitivity polarization characteristic model is equal to a ratio between the associated luminance values of the high-sensitivity polarized image and the low-sensitivity polarized image.

The low-sensitivity polarization characteristic model calculation unit 31 calculates the coefficients Af(i,j), Bf(i,j), and θf(i,j) of the polarization characteristic model from the luminance value Fm(i,j) at the target pixel (i,j) of the low-sensitivity polarized image with polarization directions of four or more directions that is generated by the low-sensitivity imaging unit 21, which is similar to the first embodiment.

The non-saturation polarized image extraction unit 32 generates a high-sensitivity non-saturation set by extracting the luminance in the polarization direction that is in the non-saturation state from the luminance value Gm(i,j) at the target pixel (i,j) of the high-sensitivity polarized image with polarization directions of four or more directions that is generated by the high-sensitivity imaging unit 22, which is similar to the first embodiment.

The high-sensitivity component acquisition unit 33-2 uses the relationship between the luminance in the polarization direction that is not saturated in the high-sensitivity polarized image and the associated luminance in the polarization direction in the low-sensitivity polarized image, and so calculates a high-sensitivity polarization characteristic model.

Here, the ratio between the amplitude and the sum of offsets in the low-sensitivity polarization characteristic model and the high-sensitivity polarization characteristic model, that is, the ratio between the luminance value Gm(i,j) that is not saturated in the high-sensitivity polarized image and the associated luminance value Fm(i,j) of the phase in the low-sensitivity polarized image is represented by Formula (5).

$$Gm(i,j) = CfgFm(i,j) \qquad (5)$$

Thus, the high-sensitivity component acquisition unit 33-2 calculates the high-sensitivity polarization characteristic model represented in Formula (6) from the low-sensitivity polarization characteristic model represented in Formula (1) by using the relationship represented in Formula (5).

$$Gm(i,j) = Cfg[Ag(i,j)[1+\cos(2\theta m + 2\theta f(i,j))] + Bg(i,j)] \qquad (6)$$

The high-sensitivity component acquisition unit 33-2 calculates, in one example, the amplitude from the high-sensitivity polarization characteristic model and sets it as the polarization component in the high-sensitivity polarized image. In addition, the high-sensitivity component acquisition unit 33-2 calculates, in one example, the minimum value from the high-sensitivity polarization characteristic model and sets it as the non-polarization component in the high-sensitivity polarized image. Moreover, the high-sensitivity component acquisition unit 33-2 may calculate the average value of the high-sensitivity polarization characteristic model to generate a high-sensitivity non-polarized image.

Next, the operation of the second embodiment will be described. The relation between the polarization direction and the luminance of the target image in the low-sensitivity polarized image and the relationship between the polarization direction and the luminance of the target image in the high-sensitivity polarized image are the relationship illustrated in FIG. 3, which is similar to the first embodiment.

The low-sensitivity polarization characteristic model calculation unit 31 of the polarized image processing unit 30-2 calculates the coefficients Af, Bf, and θf on the basis of luminance values f0, f1, f2, and f3 for the respective polarization directions at the target pixel of the low-sensitivity polarized image. In other words, the low-sensitivity polarization characteristic model calculation unit 31 calculates a low-sensitivity polarization characteristic model Ff(θ) illustrated in FIG. 9.

The non-saturation polarized image extraction unit 32 compares the luminance for each polarization direction at the target pixel of the high-sensitivity polarized image with the threshold Th to generate a high-sensitivity non-saturation set including luminance in the unsaturated polarization direction. In one example, as illustrated in FIG. 3, in a case where the luminance values for the respective polarization directions at the target pixel of the high-sensitivity polarized image are g0, g1, g2, and g3, and the luminance values g2 and g3 are smaller than the threshold Th, the high-sensitivity non-saturation set includes the luminance value g2 in the polarization direction θ2 and the luminance value g3 in the polarization direction θ3.

The high-sensitivity component acquisition unit 33-2 uses the ratio between the amplitude and the sum of offsets in the low-sensitivity polarization characteristic model and the high-sensitivity polarization characteristic model, and so calculates a high-sensitivity polarization characteristic model on the basis of the luminance that is not saturated in the high-sensitivity polarized image and the low-sensitivity polarization characteristic model.

Figure 9:
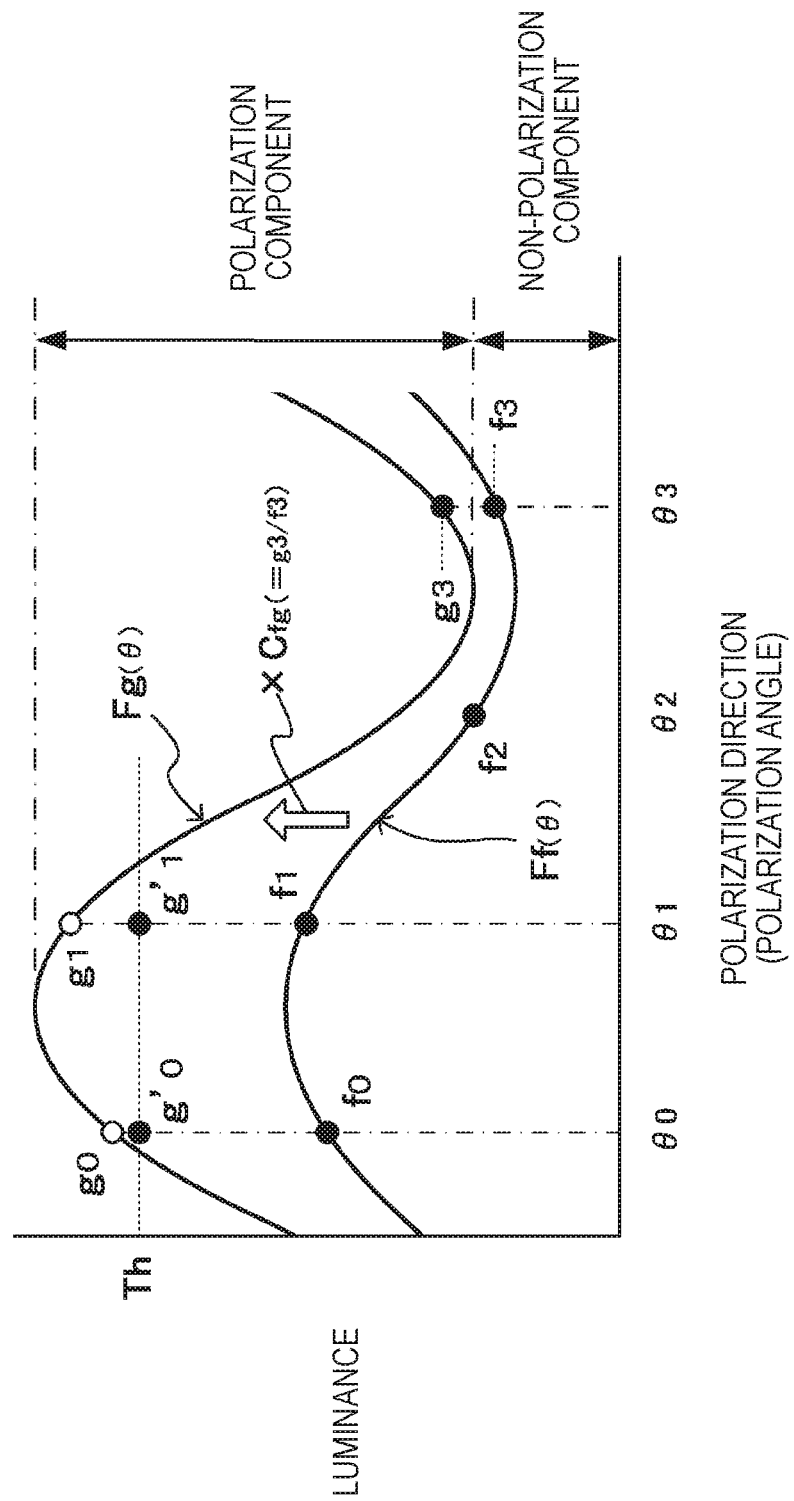
FIG. 9 is a diagram illustrating a polarization characteristic model.

Here, in FIG. 9, a coefficient Cfg, which indicates the relationship between, in one example, the luminance value g3 that is not saturated in the high-sensitivity polarized image and the associated luminance value f3 of the phase in the low-sensitivity polarized image, is "Cfg=g3/f3". The high-sensitivity component acquisition unit 33-2 calculates the high-sensitivity polarization characteristic model Fg(θ) shown in FIG. 9 on the basis of the coefficient Cfg and Formula (1). Furthermore, the high-sensitivity component acquisition unit 33-2 outputs the amplitude of the high-sensitivity polarization characteristic model Fg(θ) as a polarization component. In addition, the high-sensitivity component acquisition unit 33-2 outputs the minimum value of the high-sensitivity polarization characteristic model Fg(θ) as a non-polarization component.

The polarized image processing unit 30-2 sequentially shifts the position of the target pixel and causes the low-sensitivity polarization characteristic model calculation unit 31, the non-saturation polarized image extraction unit 32, and the high-sensitivity component acquisition unit 33-2 to repeatedly perform the above-described processing, thereby outputting an image of a non-polarization component or a polarization component of a photographic object based on the polarization characteristics of the high-sensitivity image.

Figure 10:
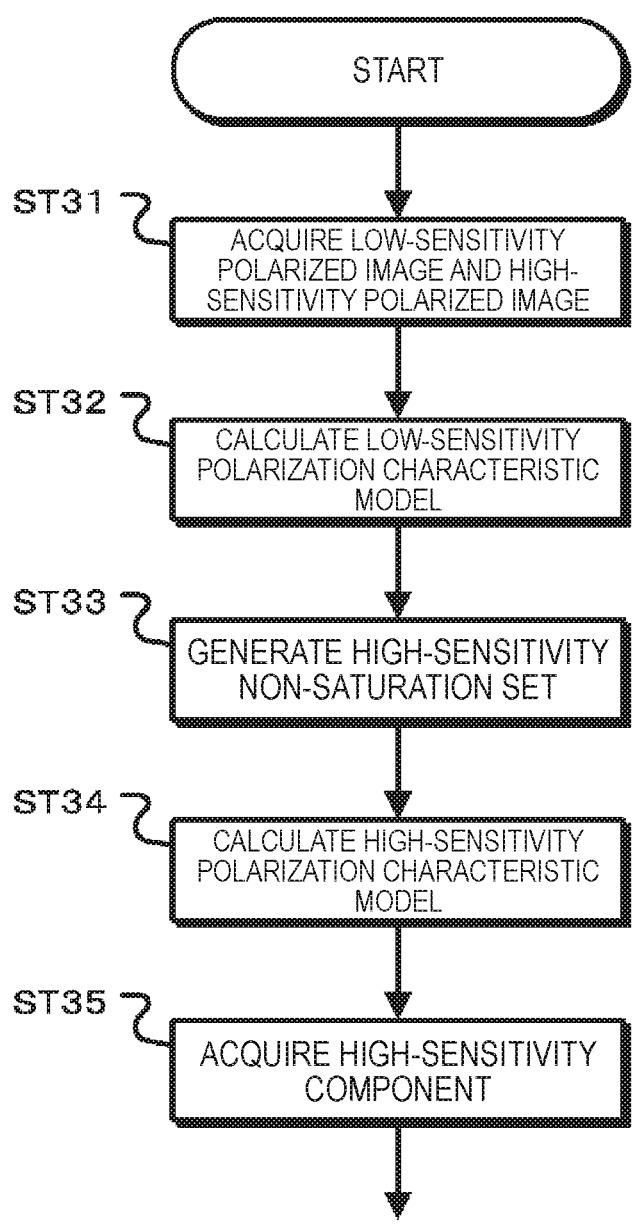
FIG. 10 is a flowchart illustrating an operation of the second embodiment.

FIG. 10 is a flowchart illustrating the operation of the second embodiment. In step ST31, the image processing device 10-2 acquires a low-sensitivity polarized image and a high-sensitivity polarized image. The image processing device 10-2 acquires the low-sensitivity polarized image including pixels in a plurality of different polarization directions, for example, pixels with polarization directions of three or more directions and acquires the high-sensitivity polarized image having higher sensitivity than the low-sensitivity polarized image, then proceeds to step ST32.

In step ST32, the image processing device 10-2 calculates a low-sensitivity polarization characteristic model. The image processing device 10-2 performs fitting to the polarization characteristic model using the luminance of the low-sensitivity polarized image in the plurality of polarization directions, and calculates the low-sensitivity polarization characteristic model, then proceeds to step ST33.

In step ST33, the image processing device 10-2 generates a high-sensitivity non-saturation set. The image processing device 10-2 extracts the luminance in the polarization direction of the non-saturation state from the high-sensitivity polarized image, and generates a high-sensitivity non-saturation set, then proceeds to step ST34.

In step ST34, the image processing device 10-2 calculates a high-sensitivity polarization characteristic model by using the luminance in one polarization direction that is in the non-saturation state. The image processing device 10-2 calculates the coefficient Cfg as described above by using the luminance in one polarization direction that is in the non-saturation state. The image processing device 10-2 calculates the high-sensitivity polarization characteristic model by multiplying the low-sensitivity polarization characteristic model calculated in step ST32 by the coefficient Cfg, and then proceeds to step ST35.

In step ST35, the image processing device 10-2 acquires a high-sensitivity component. The image processing device 10-2 acquires the amplitude value of the high-sensitivity polarization characteristic model as a polarization component and acquires the minimum value of the high-sensitivity polarization characteristic model as a non-polarization component. In addition, the image processing device 10-2 outputs the polarization component and/or the non-polarization component acquired on the basis of the polarization characteristic model.

The image processing device 10-2 sequentially shifts the position of the target pixel, performs the above-described processing for each target pixel, and outputs an image of a non-polarization component or a polarization component of a photographic object based on polarization characteristics of the high-sensitivity image.

Further, in the case where none of the luminance values in the respective polarization directions are saturated in the high-sensitivity polarized image, the high-sensitivity component acquisition unit 33-2 may determine a high-sensitivity polarization characteristic model by calculating the coefficients Ag(i,j), Bg(i,j), and θf(i,j) from the luminance in the respective polarization directions included in the high-sensitivity non-saturation set. Furthermore, in the case where all luminance values in the respective polarization directions are saturated in the high-sensitivity polarized image, the high-sensitivity component acquisition unit 33-2 acquires a polarization component or a non-polarization component from the low-sensitivity polarization characteristic model. In this case, the image processing device 10-2 performs similar processing on the other operations of the first embodiment illustrated in FIG. 7. In the second embodiment, it is possible to calculate the high-sensitivity polarization characteristic model even if the luminance in the non-saturation state is one polarization direction, and so it may not necessarily perform processing similar to that of step ST13 in FIG. 7.

According to the second embodiment as described above, it is possible to calculate the high-sensitivity polarization characteristic model on the basis of the low-sensitivity polarization characteristic model and the high-sensitivity polarized image even if the polarized image in some of the polarization directions is saturated in the high-sensitivity polarized image, which is similar to the first embodiment. Thus, it is possible to determine the polarization characteristics of a photographic object with high sensitivity. In addition, it is possible to acquire a polarization component or a non-polarization component with high sensitivity on the basis of the high-sensitivity polarization characteristic model, so, in one example, a non-polarized image with satisfactory image quality can be obtained. Furthermore, in the second embodiment, it is possible to calculate a high-sensitivity polarization characteristic model as long as the luminance in the non-saturation state may be obtained from an image in one polarization direction in a high-sensitivity polarized image, so it can have a wider application range than the first embodiment.

3. Third Embodiment

Figure 11:
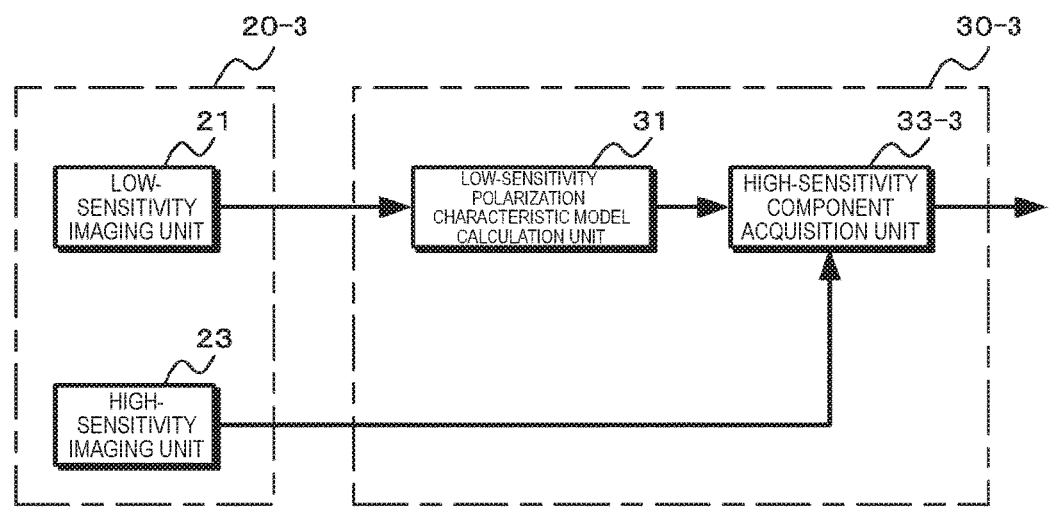
FIG. 11 is a diagram illustrating a configuration of a third embodiment.

Next, a third embodiment will be described. FIG. 11 illustrates the configuration of a third embodiment of the present technology. An image processing device 10-3 includes an imaging unit 20-3 and a polarized image processing unit 30-3.

The imaging unit 20-3 includes a low-sensitivity imaging unit 21 and a high-sensitivity imaging unit 23 having higher sensitivity than the low-sensitivity imaging unit 21.

The low-sensitivity imaging unit 21 has the configuration similar to that of the first embodiment. The low-sensitivity imaging unit 21 is configured in such a way that the image signal output from the image sensor is not saturated even if the incident light has high luminance. In one example, a light quantity limiting unit for limiting the quantity of incident light is provided on the incident surface side of the image sensor or the polarization filter in such a way that the image signal is not saturated. The low-sensitivity imaging unit 21 outputs the image signal of the generated polarized image to the polarized image processing unit 30-3.

The high-sensitivity imaging unit 23 performs the image capturing without using the light quantity limiting unit or the polarization filter, and generates a non-polarized image with higher sensitivity than the low-sensitivity imaging unit 21. The high-sensitivity imaging unit 23 outputs the image signal of the generated high-sensitivity non-polarized image to the polarized image processing unit 30-3.

The polarized image processing unit 30-3 determines polarization characteristics of a high-sensitivity image on the basis of a low-sensitivity polarized image with a plurality of polarization directions that is obtained by capturing a photographic object by the low-sensitivity imaging unit 21 and a high-sensitivity image having higher sensitivity than the low-sensitivity polarized image that is obtained by the high-sensitivity imaging unit 23, for example, a high-sensitivity non-polarized image. In addition, the polarized image processing unit 30-3 acquires a non-polarization component or a polarization component of a photographic object on the basis of the determined polarization characteristics of the high-sensitivity image.

The polarized image processing unit 30-3 includes a low-sensitivity polarization characteristic model calculation unit 31 and a high-sensitivity component acquisition unit 33-3. The polarized image processing unit 30-3 calculates a high-sensitivity polarization characteristic model from the low-sensitivity polarization characteristic model on the basis of the ratio between the average value of the low-sensitivity polarization characteristic model and the luminance of the high-sensitivity image.

The low-sensitivity polarization characteristic model calculation unit 31 calculates the coefficients Af(i,j), Bf(i,j), and θf(ij) of the low-sensitivity polarization characteristic model from the luminance value Fm(i,j) at the target pixel (i,j) of the low-sensitivity polarized image with polarization directions of four or more directions that is generated by the low-sensitivity imaging unit 21, which is similar to the first embodiment.

The high-sensitivity component acquisition unit 33-3 calculates a high-sensitivity polarization characteristic model by using the average value of the luminance values in the respective polarization directions in the low-sensitivity polarized image. The image obtained by averaging the luminance values for the respective polarization directions in the low-sensitivity polarized image corresponds to the low-sensitivity luminance non-polarized image. Thus, the relationship between the luminance value H(i,j) of the high-sensitivity non-polarized image and an average value Favg(i,j) of the low-sensitivity non-polarized image at the target pixel (i,j) can be represented as Formula (7).

$$H(i,j)=CfhFavg(i,j) \tag{7}$$

Thus, the high-sensitivity component acquisition unit 33-3 calculates, as the high-sensitivity polarization characteristic model, a polarization characteristic model equal in phase to the low-sensitivity polarization characteristic model, that is, a polarization characteristic model indicating the luminance value H(i,j) at the phase of the average value Favg(i,j) of the low-sensitivity polarization characteristic model. In other words, the polarization characteristic model shown in Formula (8) is set as the high-sensitivity polarization characteristic model.

$$H(i,j)=Cfh[Af(i,j)\{1+\cos(2\theta m+2\theta f(i,j))\}+Bf(i,j)] \tag{8}$$

The high-sensitivity component acquisition unit 33-3 sets, in one example, the amplitude of the high-sensitivity characteristic model as the polarization component. In addition, the high-sensitivity component acquisition unit 33-3 sets, in one example, the minimum value of the high-sensitivity characteristic model as the non-polarization component.

Figure 12:
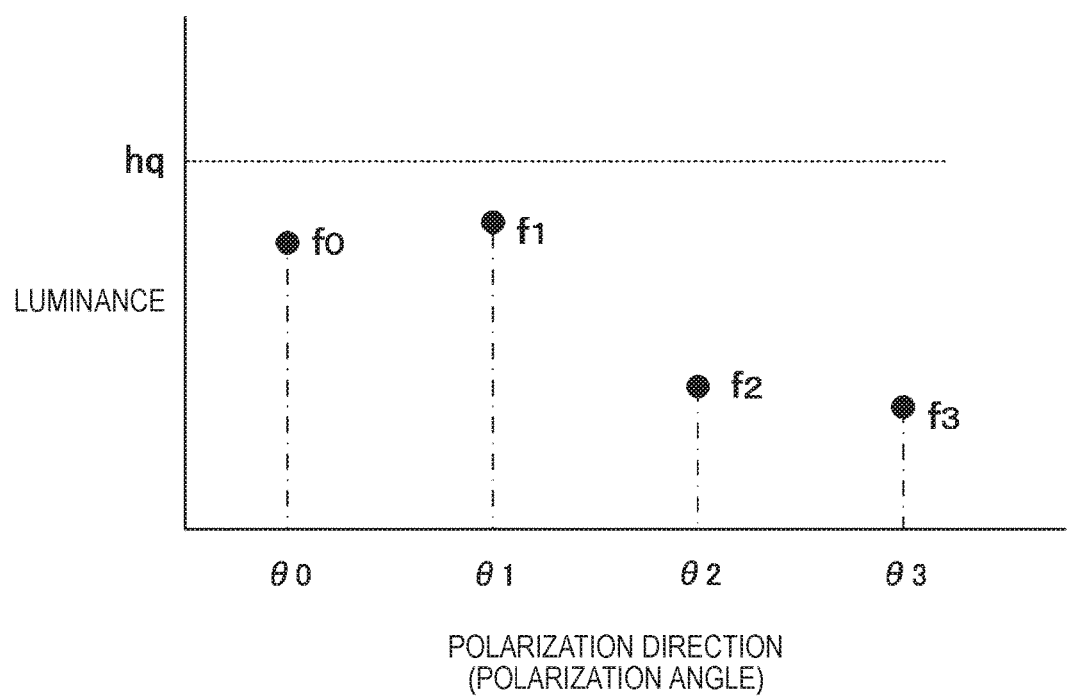
FIG. 12 is a diagram illustrating luminance for each polarization direction in a target pixel.

Next, the operation of the third embodiment will be described. FIG. 12 illustrates the luminance for each polarization direction of the target image in the low-sensitivity polarized image. Moreover, the luminance value hq indicates the luminance at a target pixel in the high-sensitivity non-polarized image.

The low-sensitivity polarization characteristic model calculation unit 31 of the polarized image processing unit 30-3 calculates the coefficients Af, Bf, and θf on the basis of luminance values f0, f1, f2, and f3 for the respective polarization directions at the target pixel of the low-sensitivity polarized image. In other words, the low-sensitivity polarization characteristic model calculation unit 31 calculates a low-sensitivity polarization characteristic model Ff(θ) illustrated in FIG. 13.

The high-sensitivity component acquisition unit 33-3 acquires a high-sensitivity polarization characteristic model by using the relationship between the average value of the low-sensitivity polarization characteristic model and the luminance of the high-sensitivity non-polarized image.

Figure 13:
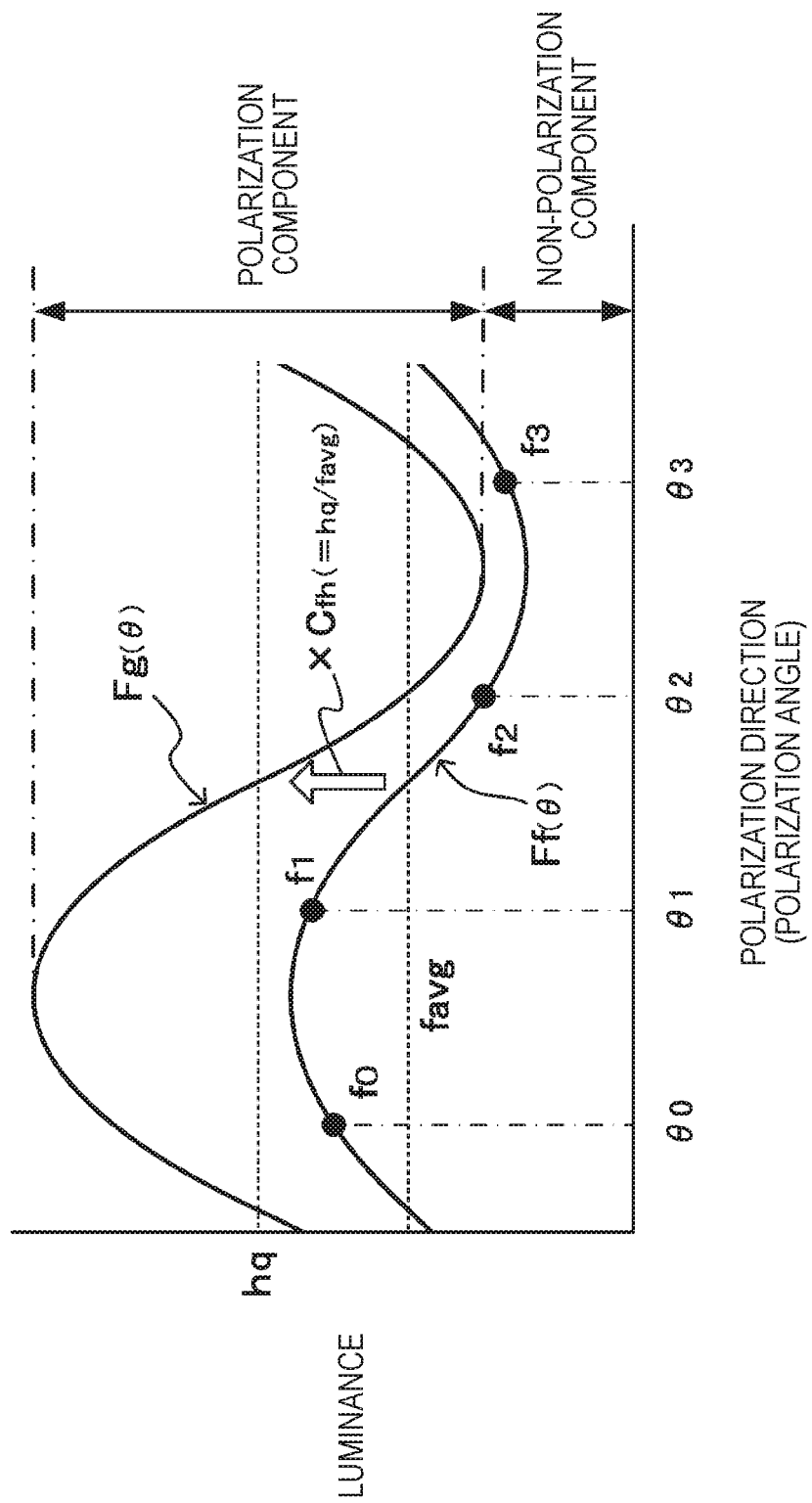
FIG. 13 is a diagram illustrating a polarization characteristic model.

Here, as illustrated in FIG. 13, for a target pixel, the average value based on the low-sensitivity polarized image is favg and the luminance value of the high-sensitivity non-polarized image is hq, so the coefficient Cfh is "Cfh=hq/favg". The high-sensitivity component acquisition unit 33-3 calculates the high-sensitivity polarization characteristic model Fg(θ) illustrated in FIG. 13 on the basis of the coefficient Cfh and Formula (1). Furthermore, the high-sensitivity component acquisition unit 33-3 outputs the amplitude of the high-sensitivity polarization characteristic model Fg(θ) as the polarization component. In addition, the high-sensitivity component acquisition unit 33-3 outputs the minimum value of the high-sensitivity polarization characteristic model Fg(θ) as the non-polarization component.

The polarized image processing unit 30-3 sequentially shifts the position of the target pixel and causes the low-sensitivity polarization characteristic model calculation unit 31 and the high-sensitivity component acquisition unit 33-3 to repeatedly perform the above-described processing, thereby outputting an image of a non-polarization component or a polarization component of a photographic object based on the polarization characteristics of the high-sensitivity image.

Figure 14:
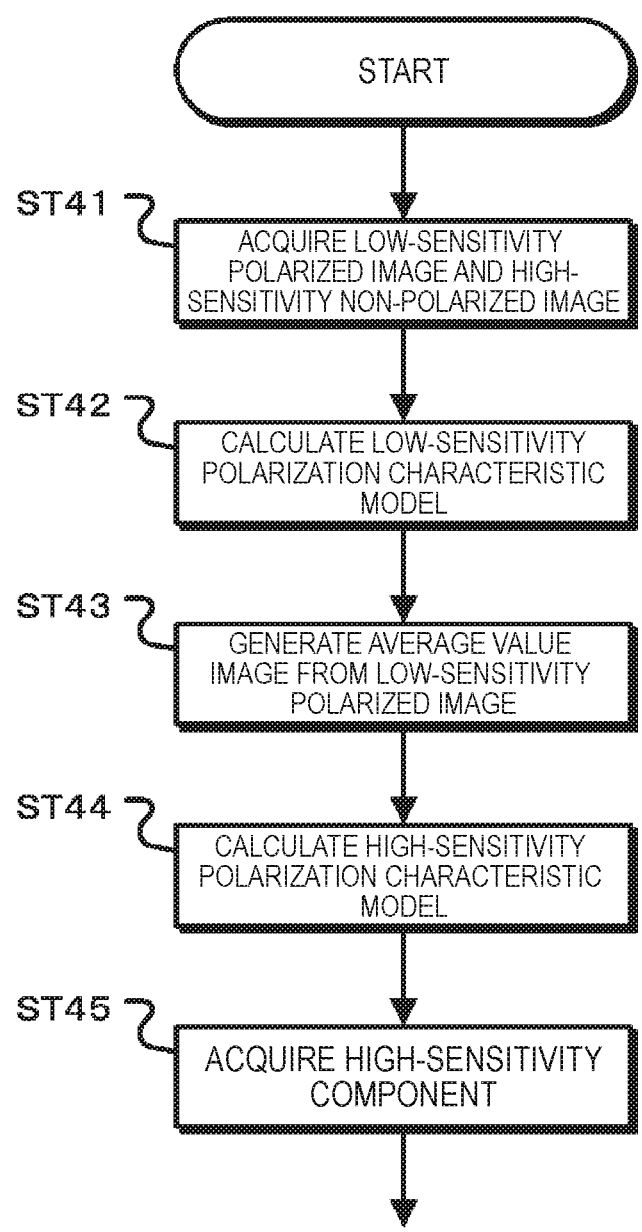
FIG. 14 is a flowchart illustrating an operation of the third embodiment.

FIG. 14 is a flowchart illustrating the operation of the third embodiment. In step ST41, the image processing device 10-3 acquires a low-sensitivity polarized image and a high-sensitivity non-polarized image. The image processing device 10-3 acquires the low-sensitivity polarized image including pixels in a plurality of different polarization directions, for example, pixels with polarization directions of three or more directions and acquires the high-sensitivity non-polarized image having higher sensitivity than the low-sensitivity polarized image and being non-polarized, then proceeds to step ST42.

In step ST42, the image processing device 10-3 calculates a low-sensitivity polarization characteristic model. The image processing device 10-3 performs fitting to the polarization characteristic model using the luminance of the low-sensitivity polarized image in the plurality of polarization directions, and calculates the low-sensitivity polarization characteristic model, then proceeds to step ST43.

In step ST43, the image processing device 10-3 generates an average value image from the low-sensitivity polarized image. The image processing device 10-3 averages luminance values in different polarization directions in the low-sensitivity polarized image to generate an average value image, and then proceeds to step ST44.

In step ST44, the image processing device 10-3 calculates a high-sensitivity polarization characteristic model. The image processing device 10-3 calculates a coefficient Cfh that makes the luminance of the average value image equal to the luminance of the high-sensitivity non-polarized image. The image processing device 10-3 calculates the high-sensitivity polarization characteristic model by multiplying the calculated coefficient Cfh by the low-sensitivity polarization characteristic model created in step ST42, and then proceeds to step ST45.

In step ST45, the image processing device 10-3 acquires a high-sensitivity component. The image processing device 10-3 acquires the amplitude value of the high-sensitivity polarization characteristic model as a polarization component and acquires the minimum value of the high-sensitivity polarization characteristic model as a non-polarization component. In addition, the image processing device 10-3 outputs the polarization component and/or the non-polarization component acquired on the basis of the polarization characteristic model.

The image processing device 10-3 sequentially shifts the position of the target pixel, performs the above-described processing for each target pixel, and outputs an image of a non-polarization component or a polarization component of a photographic object based on polarization characteristics of the high-sensitivity image.

According to the third embodiment as described above, it is possible to calculate the high-sensitivity polarization characteristic model on the basis of the low-sensitivity polarization characteristic model and the high-sensitivity non-polarized image. Thus, it is possible to determine the polarization characteristics of a photographic object with high sensitivity. In addition, the polarization component or the non-polarization component can be obtained with high sensitivity on the basis of the high-sensitivity polarization characteristic model, so, in one example, the non-polarized image with satisfactory image quality can be obtained. Furthermore, in the third embodiment, it is possible to calculate the high-sensitivity polarization characteristic model without using the polarized image as the high-sensitivity image, so the imaging unit can be configured in a manner easier than the first embodiment or the second embodiment.

4. Other Embodiments

Although the above description is given of the case where the low-sensitivity is provided with the light quantity limiting unit to generate the low-sensitivity polarized image in the imaging unit of the embodiment described above, the imaging unit is not limited to the above configuration as long as the imaging unit can acquire a low-sensitivity polarized image and a high-sensitivity polarized image (or a high-sensitivity non-polarized image). In one example, the low-sensitivity polarized image and the high-sensitivity polarized image (or the high-sensitivity non-polarized image) may be acquired by adjusting the exposure time.

Figure 15:
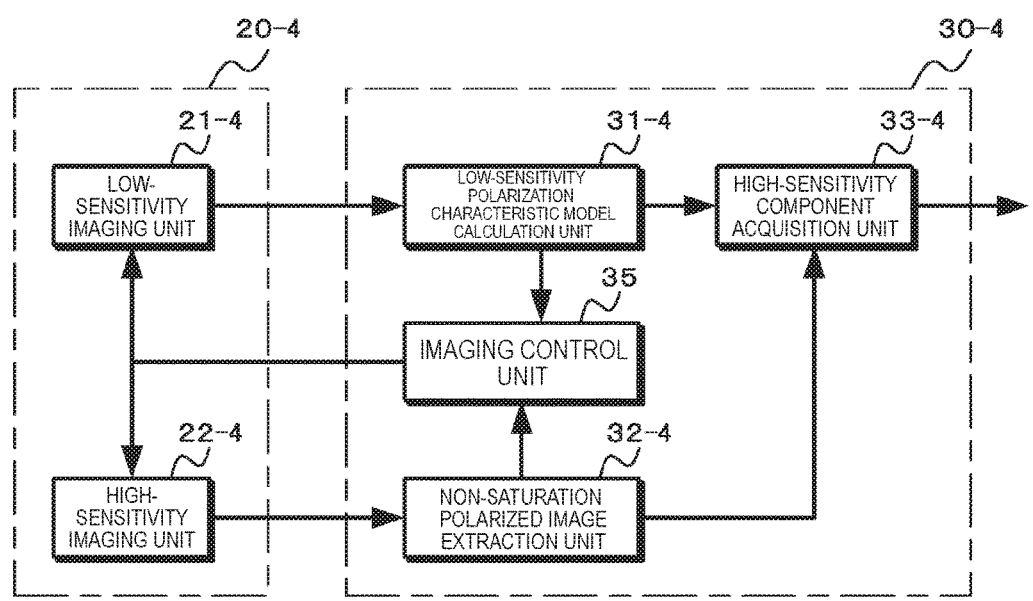
FIG. 15 illustrates a configuration in a case where an imaging control unit is provided.

FIG. 15 illustrates a configuration in the case where an image processing device is provided with an imaging control unit that controls the exposure time of an imaging unit to generate a low-sensitivity polarized image and a high-sensitivity image. An image processing device 10-4 includes an imaging unit 20-4 and a polarized image processing unit 30-4.

The imaging unit 20-4 includes a low-sensitivity imaging unit 21-4 that is configured in a similar manner to the first and second embodiments and a high-sensitivity imaging unit 22-4 having higher sensitivity than the low-sensitivity imaging unit 21-4. The exposure time of each of the low-sensitivity imaging unit 21-4 and the high-sensitivity imaging unit 22-4 can be controlled by an imaging control unit 35 of the polarized image processing unit 30-4.

In the low-sensitivity imaging unit 21-4, the imaging control unit 35 adjusts its exposure time in such a way that the image signal output from an image sensor is in the non-saturation state in polarization directions of three directions even if the incident light has high luminance. The low-sensitivity imaging unit 21-4 outputs the image signal of the generated polarized image to the polarized image processing unit 30-2.

In the high-sensitivity imaging unit 22-4, the imaging control unit 35 adjusts its exposure time in such a way that the image signal output from an image sensor is in the non-saturation state in one or more polarization directions even if the incident light has high luminance. The high-sensitivity imaging unit 22-4 outputs the image signal of the generated polarized image to the polarized image processing unit 30-4.

The polarized image processing unit 30-4 determines polarization characteristics of a high-sensitivity image on the basis of a low-sensitivity polarized image with a plurality of polarization directions that is obtained by capturing a photographic object by the low-sensitivity imaging unit 21 and a high-sensitivity image having higher sensitivity than the low-sensitivity polarized image that is obtained by the high-sensitivity imaging unit 22, for example, a high-sensitivity polarized image with the plurality of polarization directions. In addition, the polarized image processing unit 30-4 acquires a non-polarization component or a polarization component of a photographic object on the basis of the determined polarization characteristics of the high-sensitivity image. Further, the polarized image processing unit 30-4 controls the exposure by the imaging unit 20-4. The polarized image processing unit 30-4 includes a low-sensitivity polarization characteristic model calculation unit 31-4, a non-saturation polarized image extraction unit 32-4, a high-sensitivity component acquisition unit 33-4, and an imaging control unit 35.

The low-sensitivity polarization characteristic model calculation unit 31-4 calculates a low-sensitivity polarization characteristic model on the basis of the low-sensitivity polarized image generated by the low-sensitivity imaging unit 21-4, which is similar to the first embodiment. In addition, the low-sensitivity polarization characteristic model calculation unit 31-4 notifies the imaging control unit 35 of the polarization direction that is in the non-saturation state.

The non-saturation polarized image extraction unit 32-4 calculates a high-sensitivity non-saturation set from the high-sensitivity polarized image generated by the high-sensitivity imaging unit 22-4, which is similar to the first embodiment. The non-saturation polarized image extraction unit 32-4 outputs the calculated high-sensitivity non-saturation set to the high-sensitivity component acquisition unit 33-4. In addition, the non-saturation polarized image extraction unit 32-4 notifies the imaging control unit 35 of the polarization direction that is in the non-saturation state.

The high-sensitivity component acquisition unit 33-4 performs processing similar to that of the high-sensitivity component acquisition unit 33-1 of the first embodiment or the high-sensitivity component acquisition unit 33-2 of the second embodiment, and calculates a polarization characteristic model indicating the polarization characteristics of the high-sensitivity polarized image.

The imaging control unit 35 controls the exposure time in such a way that the polarization direction in the non-saturation state notified from the low sensitivity polarization characteristic model calculation unit 31-4 and the non-saturation polarized image extraction unit 32-4 is in the non-saturation state in three or more directions in the low-sensitivity polarized image and in the non-saturation state in one or more directions in the high-sensitivity polarized image.

Figure 16:
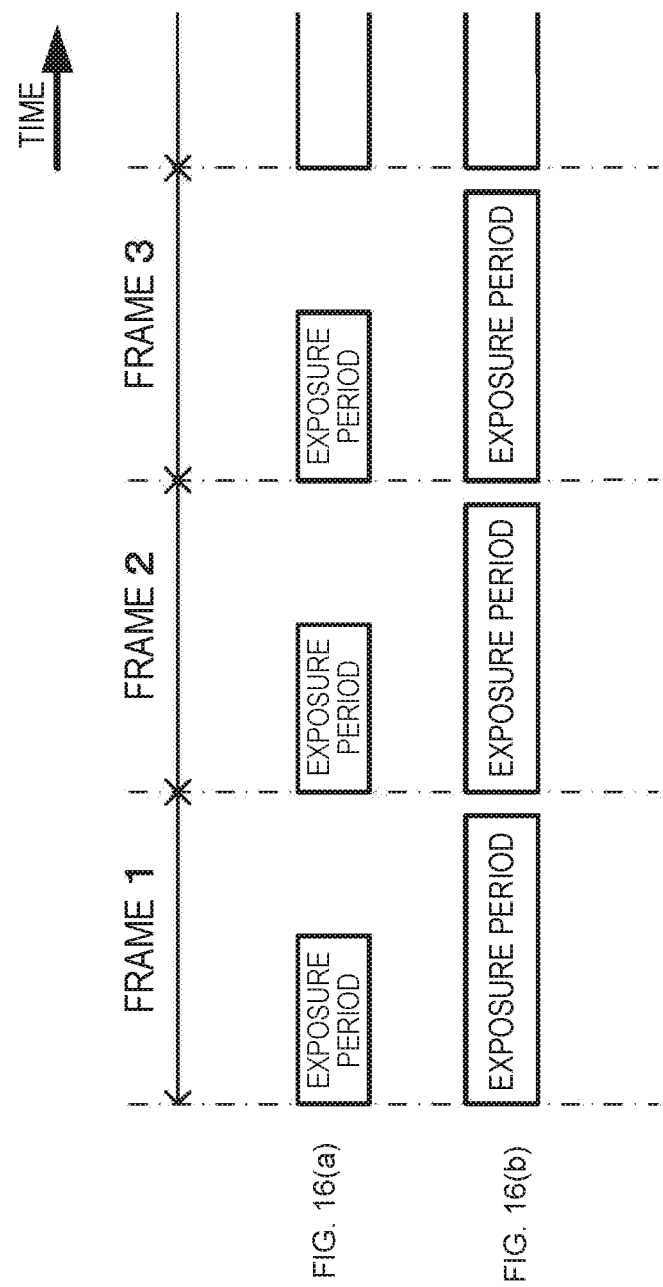
FIGS. 16(a) and 16(b) are diagrams illustrating the operation in a case of acquiring a low-sensitivity polarized image and a high-sensitivity polarized image (or a high-sensitivity non-polarized image) by adjusting the exposure time.

FIGS. 16(a) and 16(b) illustrate the operation in the case of acquiring a low-sensitivity polarized image and a high-sensitivity polarized image (or a high-sensitivity non-polarized image) by adjusting the exposure time. Moreover, FIG. 16(a) illustrates the exposure period of the low-sensitivity imaging unit, and FIG. 16(b) illustrates the exposure period of the high-sensitivity imaging unit. The low-sensitivity imaging unit and the high-sensitivity imaging unit perform image capturing, in one example, for each frame, and the low-sensitivity imaging unit causes the exposure time to be shorter than that of the high-sensitivity imaging unit, and so sets the polarization direction in which the luminance is in the non-saturation state to be three or more directions. In addition, the high-sensitivity imaging unit causes the exposure time to be longer than that of the high-sensitivity imaging unit, and so sets the polarization direction in which the luminance is in the non-saturation state to be one or more directions. Such control of the exposure time makes it possible to determine the polarization characteristics of the high-sensitivity image on the basis of the low-sensitivity polarized image in the plurality of polarization directions and the high-sensitivity image having higher sensitivity than the low-sensitivity polarized image, regardless of the intensity of reflected light.

Figure 17:
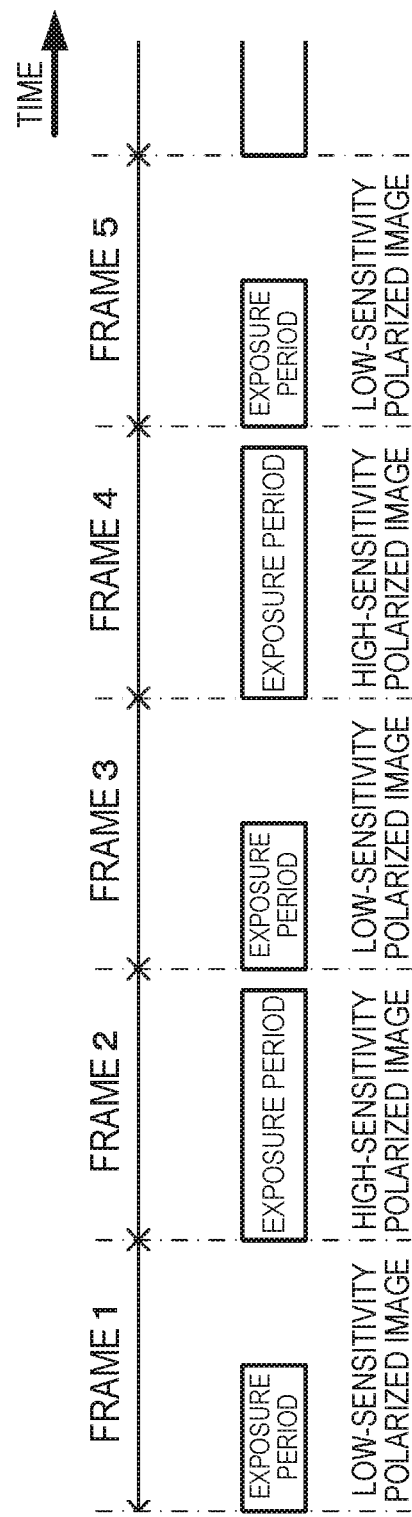
FIG. 17 is a diagram illustrating the operation in a case of alternately generating a low-sensitivity polarized image and a high-sensitivity polarized image by switching the exposure time.

Further, the embodiment described above illustrates the case where the low-sensitivity imaging unit and the high-sensitivity imaging unit are separately provided, but one image unit of them may generate both the low-sensitivity polarized image and the high-sensitivity polarized image. In the case where one image unit of them may generate both the low-sensitivity polarized image and the high-sensitivity polarized image, the imaging control unit switches the exposure time, in one example, for each frame. FIG. 17 illustrates the operation in the case where the exposure time is switched to alternately generate the low-sensitivity polarized image and the high-sensitivity polarized image. In an odd-numbered frame, a low-sensitivity polarized image is generated in an exposure time at which the polarization direction in which the luminance is in the non-saturation state is three or more directions. In addition, in the even-numbered frame, a high-sensitivity polarized image is generated in an exposure time longer than the exposure time at the time of generation of the low-sensitivity polarized image, for example, an exposure period in which the polarization direction in which the luminance is in the non-saturation state is one or more directions. In this manner, the switching of the exposure time makes it possible for one imaging unit to generate alternately the low-sensitivity polarized image and the high-sensitivity polarized image. In addition, when one imaging unit generates alternately the low-sensitivity polarized image and the high-sensitivity polarized image, pixels having the same position indicate the same position of the photographic object in the low-sensitivity polarized image and the high-sensitivity polarized image. Thus, it is possible to calculate the high-sensitivity polarization characteristic model by using the low-sensitivity polarized image and the high-sensitivity polarized image at the same pixel position, and in one example, so it is unnecessary for the low-sensitivity imaging unit and the high-sensitivity imaging unit to perform setting to cause the photographic object to be the same position, thereby easily calculating the high-sensitivity polarization characteristic model.

Further, in the case where one imaging unit generates the low-sensitivity polarized image and the high-sensitivity polarized image, a configuration in which a low-sensitivity polarized image and a high-sensitivity polarized image are simultaneously generated is available as a configuration having different sensitivities for each pixel. FIG. 18 illustrates a configuration of an imaging unit that simultaneously generates a low-sensitivity polarized image and a high-sensitivity polarized image. An imaging unit 20a includes a polarization filter 211 and a light quantity limiting unit (ND filter) 213, which are provided on the incident surface of the image sensor 210. The polarization filter 211 has a configuration in which a polarization filter 211 having the pixel arrangement with polarization directions of three or more directions is arranged. Moreover, FIG. 18 illustrates a case of using the polarization filter 211 in which a plurality of blocks, each of which includes 2×2 pixels whose polarization directions are four directions of θ0 (e.g., 0°), θ1 (e.g., 45°), θ2 (e.g., 90°), and θ3 (e.g., 135°) in units of pixels, are arranged adjacent to each other. The light quantity limiting unit 213 is configured to limit the quantity of light in the polarizer unit basis. In addition, the light quantity limiting unit is configured to include a first light quantity limiting unit ND1 and a second light quantity limiting unit ND2, which are arranged in a staggered manner. The second light quantity limiting unit ND2 has a larger light quantity limitation than the first light quantity limiting unit. The use of such an imaging unit 20a makes it possible to generate a low-sensitivity polarized image and a high-sensitivity polarized image. Moreover, in this case, in the low-sensitivity polarized image and the high-sensitivity polarized image, their pixel positions do not coincide with each other, and so interpolation processing or the like may be performed to obtain the luminance of the low-sensitivity polarized image and the high-sensitivity polarized image for each pixel.

Figures 19A, 19B, 19C, 19D, 19E, 19F, 19G, 19H:
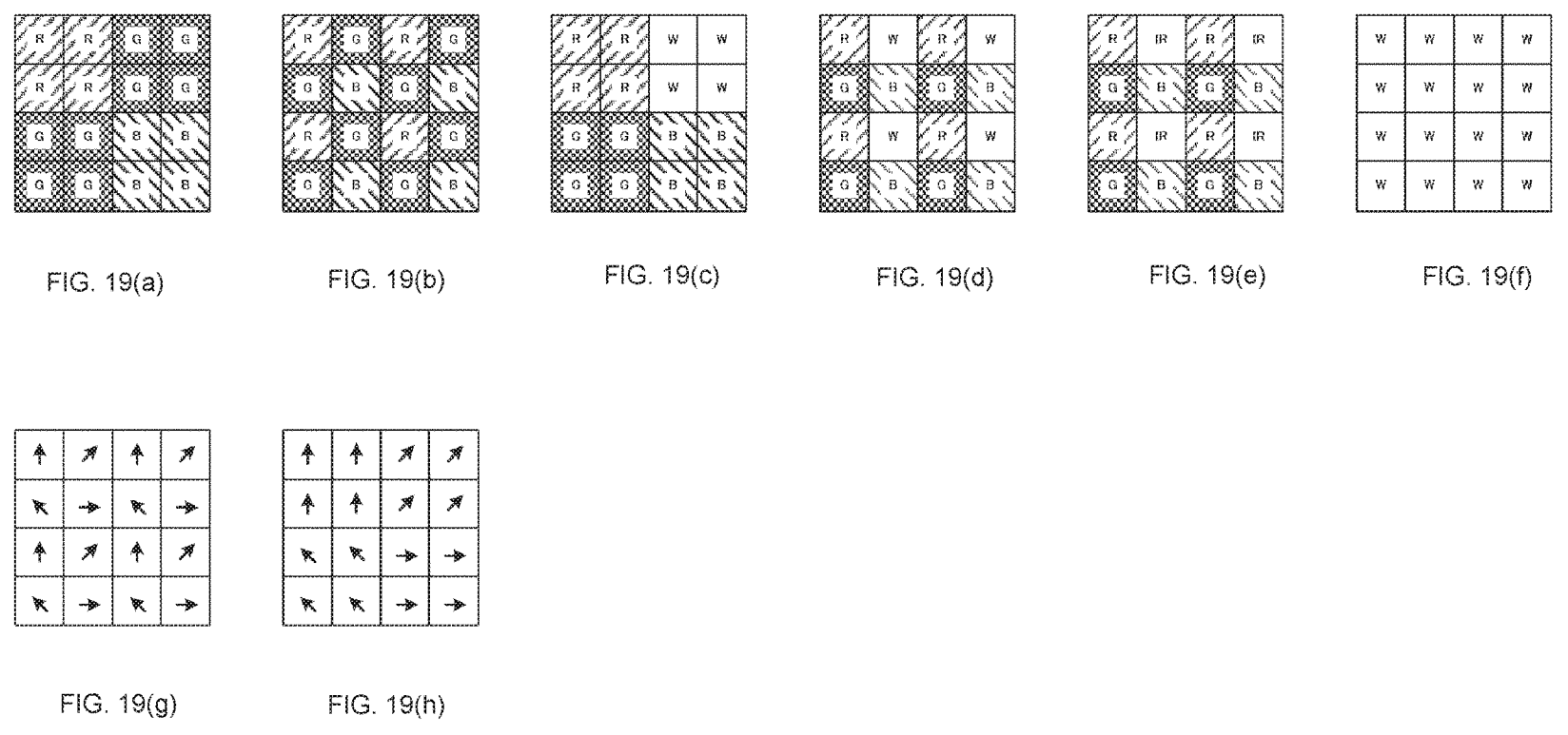

Although the embodiment described above illustrates the case where the low-sensitivity polarized image or the high-sensitivity polarized image and the high-sensitivity non-polarized image are black-and-white images, a color image may be generated as a polarized image or a non-polarized image. In this case, the imaging unit uses, in one example, a color mosaic filter to generate a pixel signal of a red pixel, a green pixel, and a blue pixel. FIGS. 19(*a*), (*b*), (*c*), (*d*), (*e*), (*f*), (*g*), and (*h*) illustrate a color mosaic filter and a polarization pattern. FIGS. 19(*a*), (*b*), (*c*), (*d*), (*e*), and (*f*) illustrate color patterns, and FIGS. 19(*g*) and 19(*h*) illustrate polarization patterns. In FIGS. 19(*g*) and 19(*h*), polarization directions are indicated by arrows.

As the color pattern, an arrangement illustrated in FIG. 19 (*a*) in which 2×2 pixels are provided repeatedly as one color component in which 2×2 color component units include one red component unit, one blue component unit, and two green component units or the Bayer array illustrated in FIG. 19(*b*) in which the color component unit is one pixel is used. In addition, a configuration in which one of the two green component units illustrated in FIG. 19(*a*) is a white pixel may be used as illustrated in FIG. 19(*c*), or a configuration in which white pixels are embedded in the Bayer array may be used as illustrated in FIG. 19(*d*). Furthermore, as illustrated in FIG. 19(*e*), in one example, an infrared (IR) pixel may be embedded in the Bayer array to enable highly sensitive shooting even at night or the like. In addition, FIG. 19(*f*) illustrates a case where all pixels are arranged as white pixels. Moreover, in FIGS. 19(*a*), (*b*), (*c*), (*d*), (*e*), (*f*), (*g*), and (*h*), the red pixel is indicated as "R", the green pixel is indicated as "G", the blue pixel is indicated as "B", the white pixel is indicated as "W", and the infrared pixel is indicated as "IR".

The polarization pattern may include pixels whose pixel unit is 2×2 pixels having different polarization directions as illustrated in FIG. 19(*g*), or may include pixels in which a pixel unit of 2×2 pixels is set as a polarization unit and 2×2 polarization unit has different polarization directions for each polarization unit as illustrated in FIG. 19(*h*).

The color pattern and the polarization pattern are used in combination to obtain four polarization components for each color component. In one example, in a case where the color mosaic filter is FIGS. 19(*a*) and 19(*c*), the polarization pattern illustrated in FIG. 19(*g*) is used. In addition, in a case where the color mosaic filter is FIGS. 19(*b*), 19(*d*) and 19(*e*), the polarization pattern illustrated in FIG. 19(*h*) is used. Furthermore, in the case where the color mosaic filter is FIGS. 19(*a*) and 19(*c*), the polarization pattern illustrated in FIG. 19(*h*) may be used by shifting the phase by one pixel in the horizontal direction and the vertical direction. In addition, in a case of using a color demosaic filter, if interpolation processing or the like is performed using the luminance in the same polarization direction with the same color component, it is possible to generate the luminance of each polarization component for each color component at each pixel position. Thus, it is possible to perform the processing of the embodiment described above for each color component, to create a high-sensitivity polarization characteristic model, and to obtain the polarization component and the non-polarization component for each color component, thereby generating a non-polarized image for each high quality color component or generating a color non-polarized image from the non-polarized image for each high quality color component.

Further, the processing in the flowcharts illustrated in the first and second embodiments described above is not limited to the order processing that performs in the order of steps, and the low-sensitivity polarization characteristic model and the high-sensitivity non-saturation set may be generated in parallel. In addition, the pipeline processing may allow a low-sensitivity polarized image and a high-sensitivity optical image to be acquired sequentially in one example on a frame basis, and allow a polarization component and/or a non-polarization component to be acquired. Furthermore, the first to third embodiments described above illustrate the configuration in which the image processing device includes the imaging unit, but the imaging unit may be provided separately from the image processing device.

5. Application Example

Figure 20:
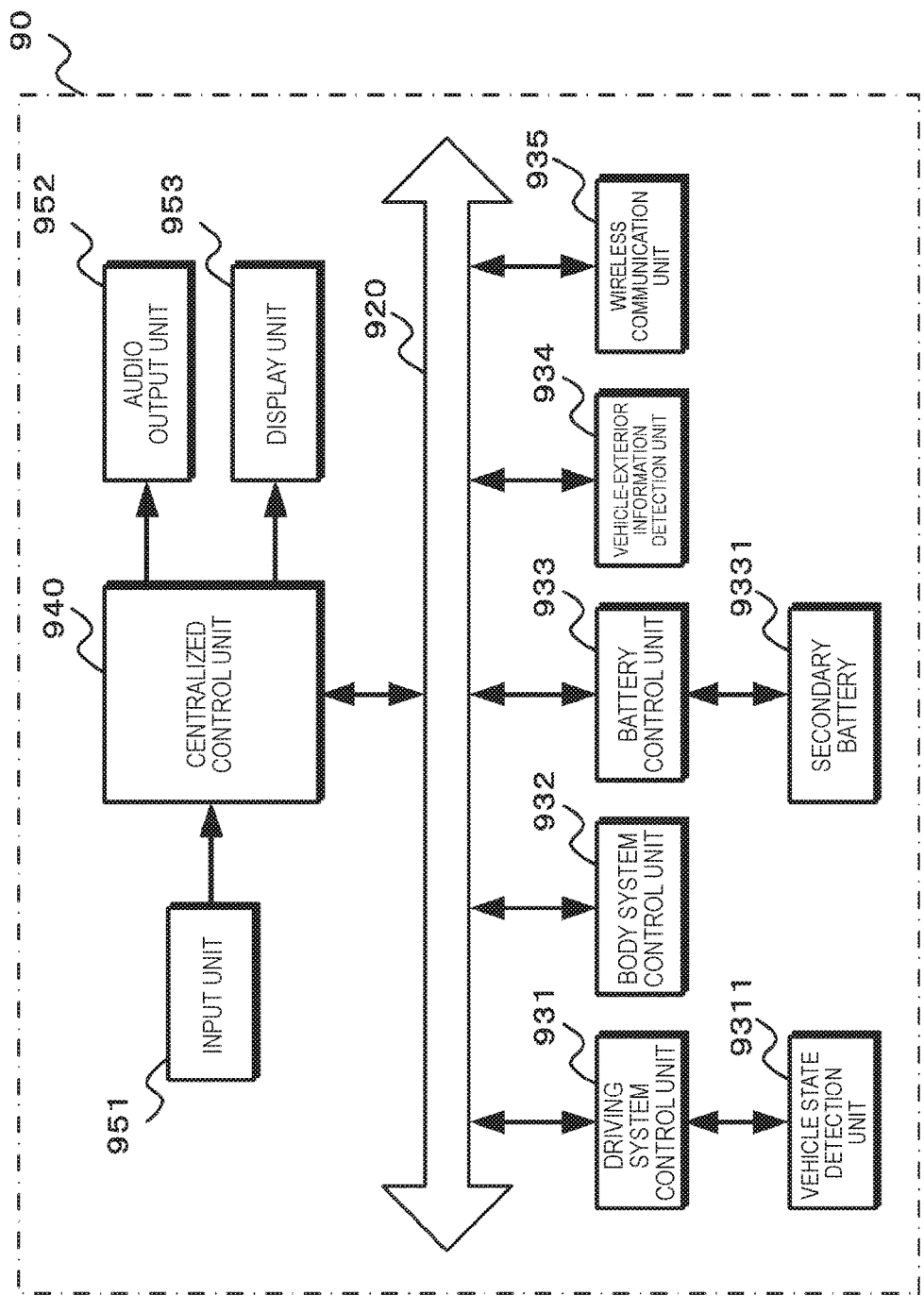
FIG. 20 is a block diagram illustrating the schematic configuration of a vehicle control system using an image processing device.

An application example of the image processing device (image processing method) is now described. FIG. 20 is a diagram illustrating a schematic configuration of a vehicle control system using the image processing device of the present technology. A vehicle control system 90 includes a plurality of control units or detection units connected to each other via a communication network 920. In the example illustrated in FIG. 20, the vehicle control system 90 includes a driving system control unit 931, a body system control unit 932, a battery control unit 933, a vehicle-exterior information detection unit 934, a wireless communication unit 935, and a centralized control unit 940. The communication network 920 may be, in one example, an in-vehicle communication network that is compliant to any standard such as control unit area network (CAN), local interconnect network (LIN), local area network (LAN), FlexRay (registered trademark), or the like. In addition, the centralized control unit 940 is connected to an input unit 951, an audio output unit 952, and a display unit 953.

Each control unit includes a microcomputer that performs arithmetic operation processing in accordance with various programs, a storage unit that stores programs executed by the microcomputer, parameters used for various arithmetic operations, or the like, and a driving circuit that drives various target devices to be controlled.

The driving system control unit 931 controls the operation of the apparatus relating to the driving system of a vehicle in accordance the various programs. In one example, the driving system control unit 931 functions as a driving force generation device for generating a driving force of a vehicle such as an internal combustion engine or a driving motor, a driving force transmission mechanism for transmitting a driving force to the wheels, and a steering mechanism for adjusting the steering angle of the vehicle. In addition, the driving system control unit 931 may have a function as a control device such as a braking device for generating a braking force of the vehicle and a function as a control device such as anti-lock brake system (ABS), electronic stability control (ESC), or the like.

The driving system control unit 931 is connected to a vehicle state detection unit 9311. The vehicle state detection unit 9311 includes, in one example, at least one of a gyro sensor for detecting angular velocity of shaft rotational motion of the vehicle body, an accelerometer for detecting acceleration of the vehicle, and a sensor for detecting operation amount of the accelerator pedal, operation amount of the brake pedal, steering angle of the steering wheel, engine RPM, driving speed, or the like. The driving system control unit 931 performs the arithmetic operation processing using the signal input from the vehicle state detection unit 9311, and controls the internal combustion engine, driving motor, electric power steering device, brake device, or the like.

The body system control unit 932 controls the operation of various devices equipped on the vehicle body in accordance with various programs. In one example, the body system control unit 932 functions as a keyless entry system, a smart key system, a power window device, or a control device for various lamps such as headlamp, tail lamp, brake lamp, turn signal lamp, fog lamp, or the like. In this case, the body system control unit 932 can receive radio waves transmitted from a portable device that substitutes for a key or a signal of various switches. The body system control unit 932 receives the input of such a radio wave or signal and controls the door lock device, the power window device, the lamp, or the like of the vehicle.

The battery control unit 933 controls a secondary battery 9331 that is a power supply source of the driving motor in accordance with various programs. In one example, information such as battery temperature, battery output voltage, and remaining capacity of the battery is input from the battery device including the secondary battery 9331 to the battery control unit 933. The battery control unit 933 performs arithmetic operation processing using these signals and performs temperature adjustment control of the secondary battery 9331 or control of a cooling device or the like provided in the battery device.

The vehicle-exterior information detection unit 934 detects information outside the vehicle equipped with the vehicle control system 90. The vehicle-exterior information detection unit 934 uses the image processing device 10-1 (or 10-2, 10-3, or 10-4) of the present technology.

Figure 21:
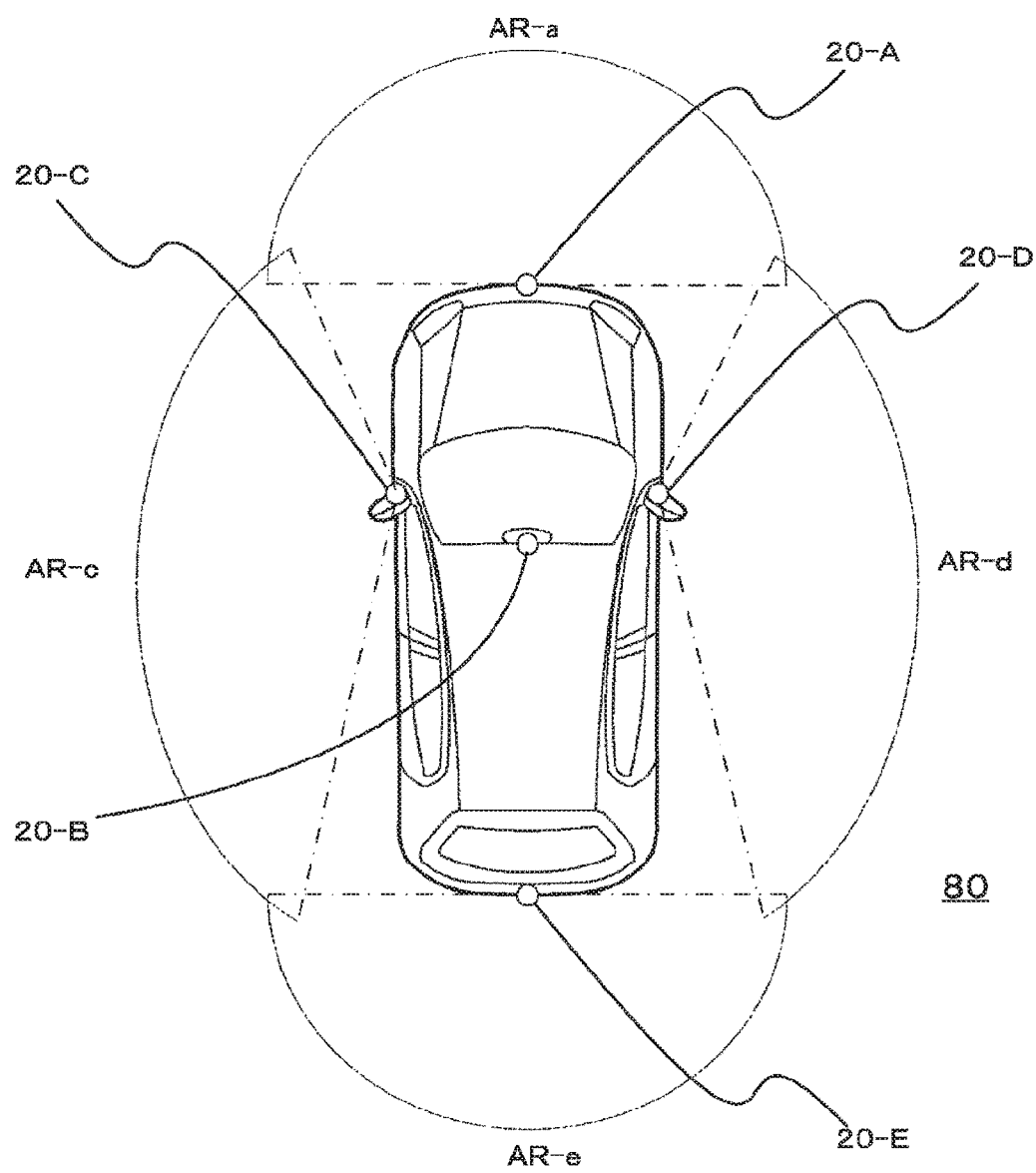
FIG. 21 is a diagram illustrating an installation example of an imaging unit.

FIG. 21 is a diagram illustrating an installation example of the imaging unit. The polarization imaging unit 20-1 (or 20-2, 20-3, or 20-4) of the image processing device 10-1 (10-2, 10-3, or 10-4) is provided at the position of, in one example, at least one of the front nose, side mirror, rear bumper, and back door of a vehicle 80, and the upper portion of the windshield in the vehicle passenger compartment. An imaging unit 20-A provided at the front nose and an imaging unit 20-B provided on the upper portion of the windshield in the vehicle passenger compartment mainly acquire an image ahead of the vehicle 80. Imaging units 20-C and 20-D provided in the side mirror mainly acquire an image of the side of the vehicle 80. An imaging unit 20-E provided in the rear bumper or the back door mainly acquires an image behind the vehicle 80. In addition, FIG. 21 illustrates an example of the shooting range of each of the imaging units 20-A to 20-E. An image capturing range AR-a indicates the image capturing range of the imaging unit 20-A provided in the front nose. Image capturing ranges AR-c and AR-d indicate the image capturing range of the imaging units 20-C and 20-D provided on the side mirrors, respectively. An image capturing range AR-e indicates the image capturing range of the imaging unit 20-E provided in the rear bumper or back door.

Referring back to FIG. 20, the vehicle-exterior information detection unit 934 captures an image of a peripheral region of the vehicle and acquires a polarized image. In addition, the vehicle-exterior information detection unit 934 acquires polarization characteristics of a photographic object from the acquired polarized image. Furthermore, the vehicle-exterior information detection unit 934 generates information usable for vehicle control or the like using the acquired polarization characteristics.

The wireless communication unit 935 communicates with a management center that manages external situation of the vehicle, for example, other vehicles or road conditions via a wireless communication network such as dedicated short range communication (DSRC, registered trademark), and outputs the received information to the centralized control unit 940. In addition, the wireless communication unit 935 transmits the polarization characteristics or the like acquired by the vehicle-exterior information detection unit 934 to other vehicles, the management center, or the like. Moreover, the wireless communication unit 935 may communicate with the management center via a wireless communication network such as a wireless LAN wireless communication network, a wireless communication network for mobile phones such as 3G, LTE, and 4G, or the like. In addition, the wireless communication unit 935 may receive a signal or the like of the global navigation satellite system (GNSS), perform positioning, and output the positioning result to the centralized control unit 940.

The centralized control unit 940 is connected to the input unit 951, the audio output unit 952, and the display unit 953. The input unit 951 is provided as, in one example, a device operable by a vehicle driver, such as a touch panel, a button, a microphone, a switch, or a lever. The input unit 951 generates an input signal on the basis of information input by a vehicle driver or the like, and outputs it to the centralized control unit 940.

The audio output unit 952 audibly notifies the vehicle driver of the information by outputting sound on the basis of an audio signal from the centralized control unit 940. The display unit 953 displays an image on the basis of an image signal from the centralized control unit 940 and visually notifies the vehicle driver of the information.

The centralized control unit 940 includes a central processing unit (CPU), a read only memory (ROM), a random access memory (RAM), or the like. The read only memory (ROM) stores various programs to be executed by a central processing unit (CPU). The random access memory (RAM) stores information such as various parameters, arithmetic operation result, or sensor signal. The CPU executes various programs stored in the ROM and controls the overall operation in the vehicle control system 90 depending on an input signal from the input unit 951, information obtained by communication with each control unit, the vehicle-exterior information detection unit, and the wireless communication unit via the communication network 920, and information stored in the RAM, or the like. In addition, the centralized control unit 940 generates an audio signal indicating information to be audibly notified to the vehicle driver and outputs it to the audio output unit 952, and the centralized control unit 940 generates an image signal visually notifying the information and outputs it to the display unit 953. In addition, the centralized control unit 940 communicates with various devices existing outside the vehicle, such as other vehicles or the management center, using the wireless communication unit 935. In addition, the centralized control unit 940 supports the vehicle driving on the basis of map information stored in ROM or RAM and the positioning result acquired from the wireless communication unit 935.

Moreover, in the example illustrated in FIG. 20, at least two control units connected via the communication network 920 may be integrated as one control unit. Alternatively, each control unit may include a plurality of control units. Furthermore, the vehicle control system 90 may include another control unit that is not illustrated. In addition, in the above description, some or all of the functions carried out by any control unit may be provided to other control units. In other words, as long as information is transmitted and received via the communication network 920, the predetermined arithmetic operation processing may be performed by any control unit.

In such a vehicle control system, in a case where the image processing device of the present technology is applied to, in one example, the vehicle-exterior information detection unit, it is possible for the vehicle-exterior information detection unit to acquire an image with satisfactory image quality from which a reflected component is removed even if the reflected light is strong. Thus, it is possible to detect accurately and easily obstacles or the like by using an image acquired by the vehicle-exterior information detection unit, thereby constructing a vehicle control system that enables safer driving.

Further, the image processing device described above may be applicable to a monitoring system. In a case of employing a monitoring system, even when a photographic object is difficult to be viewed due to the influence of the reflected light, it is possible to obtain a photographic object's image with satisfactory image quality from which the reflection component is removed, thereby monitoring the photographic object with ease. Furthermore, the image processing device described above is not limited to the vehicle control system or the monitoring system, but may be applicable to an imaging apparatus, an electronic apparatus having an imaging function, or the like. Further, a series of processing described herein can be executed by hardware, software, or the combination thereof. In a case of executing the processing by the software, the processing can be executed by installing the program in which the processing sequence is recorded in the memory of the computer embedded in the dedicated hardware, or can be executed by installing the program in the general-purpose computer that can execute various processing.

In one example, the program can be recorded previously on a hard disk, a solid-state drive (SSD), or a read only memory (ROM), as a recording medium. Alternatively, the program can be temporarily or permanently stored (recorded) in (on) a removable recording medium such as a flexible disk, a compact disc read only memory (CD-ROM), Magneto Optical (MO) disk, a digital versatile disc (DVD), a Blu-Ray Disc (registered trademark) (BD), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a local area network (LAN) or the Internet. In such a computer, a program transferred in the aforementioned manner can be received and installed on a recording medium such as built-in hardware.

Note that the effects described in the present specification are merely examples, not limitative; and additional effects that are not described may be exhibited. Furthermore, the present technology is not construed as being limited to the above-described embodiments of the technology. The embodiments of the technology disclose the present technology in the form of exemplification, and it is obvious that a person skilled in the art can make modification or substitution of the embodiments without departing from the gist of the present technology. In other words, in order to determine the gist of the present technology, the claims should be considered.

Additionally, the present technology may also be configured as below.

(1)

An image processing device including:

a polarized image processing unit configured to determine polarization characteristics of a high-sensitivity image on a basis of a low-sensitivity polarized image in a plurality of polarization directions and the high-sensitivity image having higher sensitivity than the low-sensitivity polarized image to acquire a non-polarization component or a polarization component of a photographic object on a basis of the polarization characteristics of the high-sensitivity image.

(2)

The image processing device according to (1), in which the polarized image processing unit calculates a low-sensitivity polarization characteristic model on a basis of the low-sensitivity polarized image, calculates a high-sensitivity polarization characteristic model indicating the polarization characteristics of the high-sensitivity image on a basis of the low-sensitivity polarization characteristic model and the high-sensitivity image, and acquires the non-polarization component or the polarization component of the photographic object on a basis of the high-sensitivity polarization characteristic model.

(3)

The image processing device according to (2), in which the high-sensitivity image is a polarized image, and the polarized image processing unit calculates the high-sensitivity polarization characteristic model on a basis of the low-sensitivity polarization characteristic model and an image in a polarization direction in which saturation has not occurred in the high-sensitivity polarized image.

(4)

The image processing device according to (3), in which the polarized image processing unit calculates the high-sensitivity polarization characteristic model from phase information of the low-sensitivity polarization characteristic model and an image in a plurality of polarization directions in which saturation has not occurred in the high-sensitivity polarized image.

(5)

The image processing device according to (4), in which the polarized image processing unit calculates the high-sensitivity polarization characteristic model having a phase component identical to the low-sensitivity polarization characteristic model that indicates a relationship between a polarization direction and luminance of a polarization component from luminance in the plurality of polarization directions in which saturation has not occurred in the high-sensitivity polarized image.

(6)

The image processing device according to (3), in which the polarized image processing unit calculates the high-sensitivity polarization characteristic model from the low-sensitivity polarization characteristic model on a basis of a relationship between luminance of the high-sensitivity polarized image in the polarization direction in which saturation has not occurred and luminance in the low-sensitivity polarized image in an identical polarization direction.

(7)

The image processing device according to (6), in which the polarized image processing unit calculates the high-sensitivity polarization characteristic model having a phase component identical to the low-sensitivity polarization characteristic model that indicates a relationship between a polarization direction and luminance of a polarization component in such a way that a ratio between an amplitude and a sum of offsets in the low-sensitivity polarization characteristic model and the high-sensitivity polarization characteristic model is equal to a ratio between associated luminance values of the high-sensitivity polarized image and the low-sensitivity polarized image.

(8)

The image processing device according to any one of (3) to (7), in which the polarized image processing unit, in a case where all the high-sensitivity polarized images in the plurality of polarization directions are in a saturation state, acquires the non-polarization component or the polarization component of the photographic object on a basis of the low-sensitivity polarization characteristic model.

(9)

The image processing device according to any one of (3) to (7), in which the polarized image processing unit, in a case where all the high-sensitivity polarized images in the plurality of polarization directions are in a non-saturation state, calculates the high-sensitivity polarization characteristic model on a basis of the high-sensitivity polarized image.

(10)

The image processing device according to (2), in which the high-sensitivity image is a non-polarized image, and the polarized image processing unit calculates the high-sensitivity polarization characteristic model from the low-sensitivity polarization characteristic model on a basis of a ratio between an average value of the low-sensitivity polarization characteristic model and luminance of the high-sensitivity image.

(11)

The image processing device according to any one of (2) to (10), in which the polarized image processing unit sets an amplitude of the high-sensitivity polarization characteristic model as the polarization component and sets a minimum value of the high-sensitivity polarization characteristic model as the non-polarization component.

(12)

The image processing device according to any one of (1) to (11), further including:

an imaging control unit configured to cause an imaging unit to generate the low-sensitivity polarized image and the high-sensitivity image by changing an exposure time of the imaging unit.

(13)

The image processing device according to (12), in which the imaging control unit controls the exposure time in such a way that a polarization direction in the low-sensitivity polarized image is in a non-saturation state in three or more directions and a polarization direction in the high sensitivity image is in a non-saturation state in one or more directions.

(14)

The image processing device according to any one of (1) to (13), further including:

an imaging unit configured to generate the low-sensitivity polarized image and the high-sensitivity image.

(15)

The image processing device according to any one of (1) to (14), in which the imaging unit generates the low-sensitivity polarized image including pixels in the plurality of polarization directions, each of the polarization directions being set in units of pixels.

(16)

The image processing device according to (14), in which the imaging unit generates the low-sensitivity polarized image and the high-sensitivity image by changing an exposure time.

(17)

The image processing device according to (14), in which the imaging unit includes a low-sensitivity imaging unit configured to generate the low-sensitivity polarized image and a high-sensitivity imaging unit configured to generate the high-sensitivity image by limiting quantity of incident light more than the quantity of incident light limited by the low-sensitivity imaging unit.

(18)

The image processing device according to (14), in which the imaging unit includes a low-sensitivity pixel configured to generate the low-sensitivity polarized image and a high-sensitivity pixel configured to generate the high-sensitivity image by limiting quantity of incident light more than the quantity of incident light limited by the low-sensitivity pixel.

INDUSTRIAL APPLICABILITY

In the image processing device and the image processing method of this technology, polarization characteristics of a high-sensitivity image are obtained on the basis of a low-sensitivity polarized image in a plurality of polarization directions and a high-sensitivity image having higher sensitivity than the low-sensitivity polarized image, and so a non-polarization component or a polarization component of a photographic object is acquired on the basis of the polarization characteristics of the high-sensitivity image. Thus, it is possible to determine the polarization characteristics of a photographic object with high sensitivity from an image, and it is possible to acquire a high-sensitivity non-polarization component or polarization component. Thus, it is suitable for, in one example, a system in which it is preferable to remove the influence of reflected light from a captured image, for example, the vehicle control system, the monitoring system, or the like.

REFERENCE SIGNS LIST 10, 10-1 to 10-4 image processing device
20, 20-1 to 20-4, 20a, 20-A to 20-E imaging unit
21, 21-4 low-sensitivity imaging unit
22, 22-4, 23 high-sensitivity imaging unit
30-1 to 30-4 polarized image processing unit
31, 31-4 low-sensitivity polarization characteristic model calculation unit
32, 32-4 non-saturation polarized image extraction unit 33-1, 33-2, 33-3, 33-4 high-sensitivity component acquisition unit
35 imaging control unit
80 vehicle
210 image sensor
211 polarization filter
212, 213 light quantity limiting unit (ND filter)

The invention claimed is:

1. An image processing device comprising:
a polarized image processing unit configured to determine polarization characteristics of a high-sensitivity image based on a low-sensitivity polarized image in a plurality of polarization directions and the high-sensitivity image having higher sensitivity than the low-sensitivity polarized image to acquire one of a non-polarization component or a polarization component of a photographic object based on the polarization characteristics of the high-sensitivity image.

2. The image processing device according to claim 1,
wherein the polarized image processing unit is further configured to calculate a low-sensitivity polarization characteristic model based on the low-sensitivity polarized image, calculate a high-sensitivity polarization characteristic model indicating the polarization characteristics of the high-sensitivity image based on the low-sensitivity polarization characteristic model and the high-sensitivity image, and acquire one of the non-polarization component or the polarization component of the photographic object based on the high-sensitivity polarization characteristic model.

3. The image processing device according to claim 2,
wherein the high-sensitivity image is a polarized image, and
the polarized image processing unit is further configured to calculate the high-sensitivity polarization characteristic model based on the low-sensitivity polarization characteristic model and an image in a polarization direction in which saturation has not occurred in the high-sensitivity polarized image.

4. The image processing device according to claim 3,
wherein the polarized image processing unit is further to calculate the high-sensitivity polarization characteristic model from phase information of the low-sensitivity polarization characteristic model and an image in a plurality of polarization directions in which saturation has not occurred in the high-sensitivity polarized image.

5. The image processing device according to claim 4,
wherein the polarized image processing unit is further configured to calculate the high-sensitivity polarization characteristic model having a phase component identical to the low-sensitivity polarization characteristic model that indicates a relationship between a polarization direction and luminance of a polarization component from luminance in the plurality of polarization directions in which the saturation has not occurred in the high-sensitivity polarized image.

6. The image processing device according to claim 3,
wherein the polarized image processing unit is further configured to calculate the high-sensitivity polarization characteristic model from the low-sensitivity polarization characteristic model based on a relationship between luminance of the high-sensitivity polarized image in the polarization direction in which the saturation has not occurred and luminance in the low-sensitivity polarized image in an identical polarization direction.

7. The image processing device according to claim 6,
wherein the polarized image processing unit is further configured to calculate the high-sensitivity polarization characteristic model having a phase component identical to the low-sensitivity polarization characteristic model that indicates a relationship between a polarization direction and luminance of a polarization component in such a way that a ratio between an amplitude and a sum of offsets in the low-sensitivity polarization characteristic model and the high-sensitivity polarization characteristic model is equal to a ratio between associated luminance values of the high-sensitivity polarized image and the low-sensitivity polarized image.

8. The image processing device according to claim 3,
wherein the polarized image processing unit, in a case where all high-sensitivity polarized images in the plurality of polarization directions are in a saturation state, is further configured to aquire one of the non-polarization component or the polarization component of the photographic object based on the low-sensitivity polarization characteristic model.

9. The image processing device according to claim 3,
wherein the polarized image processing unit, in a case where all the high-sensitivity polarized images in the plurality of polarization directions are in a non-saturation state, is further configured to calculate the high-sensitivity polarization characteristic model based on the high-sensitivity polarized image.

10. The image processing device according to claim 2,
wherein the high-sensitivity image is a non-polarized image, and
the polarized image processing unit is further configured to calculate the high-sensitivity polarization characteristic model from the low-sensitivity polarization characteristic model based on a ratio between an average value of the low-sensitivity polarization characteristic model and luminance of the high-sensitivity image.

11. The image processing device according to claim 2,
wherein the polarized image processing unit is further configured to set an amplitude of the high-sensitivity polarization characteristic model as the polarization component and sets a minimum value of the high-sensitivity polarization characteristic model as the non-polarization component.

12. The image processing device according to claim 1, further comprising:
an imaging control unit configured to cause an imaging unit to generate the low-sensitivity polarized image and the high-sensitivity image by changing an exposure time of the imaging unit.

13. The image processing device according to claim 12,
wherein the imaging control unit is further configured to control the exposure time in such a way that a polarization direction in the low-sensitivity polarized image is in a non-saturation state in three or more directions and a polarization direction in the high sensitivity image is in a non-saturation state in one or more directions.

14. The image processing device according to claim 1, further comprising:
an imaging unit configured to generate the low-sensitivity polarized image and the high-sensitivity image.

15. The image processing device according to claim 14,
wherein the imaging unit is further configured to generate the low-sensitivity polarized image including pixels in the plurality of polarization directions, each of the polarization directions being set in units of pixels.

16. The image processing device according to claim 14, wherein the imaging unit is further configured to generate the low-sensitivity polarized image and the high-sensitivity image by changing an exposure time.

17. The image processing device according to claim 14, wherein the imaging unit includes a low-sensitivity imaging unit configured to generate the low-sensitivity polarized image and a high-sensitivity imaging unit configured to generate the high-sensitivity image by limiting quantity of incident light more than the quantity of incident light limited by the low-sensitivity imaging unit.

18. The image processing device according to claim 14, wherein the imaging unit includes a low-sensitivity pixel configured to generate the low-sensitivity polarized image and a high-sensitivity pixel configured to generate the high-sensitivity image by limiting quantity of incident light more than the quantity of incident light limited by the low-sensitivity pixel.

19. An image processing method comprising:
determining polarization characteristics of a high-sensitivity image based on a low-sensitivity polarized image in a plurality of polarization directions and the high-sensitivity image having higher sensitivity than the low-sensitivity polarized image; and
acquiring one of a non-polarization component or a polarization component of a photographic object based on the polarization characteristics of the high-sensitivity image.

* * * * *